United States Patent
Suito et al.

(10) Patent No.: US 6,925,340 B1
(45) Date of Patent: Aug. 2, 2005

(54) SOUND REPRODUCTION METHOD AND SOUND REPRODUCTION APPARATUS

(75) Inventors: Taro Suito, Kanagawa (JP); Masashi Ohta, Tokyo (JP); Masayoshi Miura, Chiba (JP)

(73) Assignee: Sony Corporation, Tokyo (JP)

( * ) Notice: Subject to any disclaimer, the term of this patent is extended or adjusted under 35 U.S.C. 154(b) by 865 days.

(21) Appl. No.: 09/643,300

(22) Filed: Aug. 22, 2000

(30) Foreign Application Priority Data

Aug. 24, 1999 (JP) .................................. 11-236412
Jun. 8, 2000 (JP) .............................. 2000-171556

(51) Int. Cl.⁷ .............................................. G06F 17/00
(52) U.S. Cl. .............................. 700/94; 386/75; 386/6; 386/68; 704/503; 704/278
(58) Field of Search ................................ 704/210, 201, 704/503, 500, 501, 502, 504, 225, 278; 369/60.01; 348/515; 386/75, 6, 7, 8, 68, 81; 700/94

(56) References Cited

U.S. PATENT DOCUMENTS

| | | | | |
|---|---|---|---|---|
| 5,157,728 A | * | 10/1992 | Schorman et al. | 704/502 |
| 6,076,063 A | * | 6/2000 | Unno et al. | 704/500 |
| 6,169,240 B1 | * | 1/2001 | Suzuki | 84/605 |
| 6,310,652 B1 | * | 10/2001 | Li et al. | 348/515 |
| 6,363,208 B2 | * | 3/2002 | Nitta et al. | 386/75 |
| 6,574,422 B1 | * | 6/2003 | Kikuchi et al. | 386/105 |

* cited by examiner

*Primary Examiner*—Xu Mei
*Assistant Examiner*—Justin Michalski
(74) *Attorney, Agent, or Firm*—Frommer Lawrence & Haug LLP; William S. Frommer; Darren M. Simon

(57) ABSTRACT

An apparatus and method for recording and reproducing a sound (i.e. audio) signal corresponding to a video signal at a higher than normal speed. The method delimits a sound signal reproduced at a recording medium at a speed higher than a normal speed into successive processing unit periods. For each processing unit period, sound absence portion(s) of the reproduced sound signal are deleted (or partially deleted) within a range corresponding to a normal speed reproduction. Sound presence portions preceding and following the deleted absence portions are joined or compressed to produce a recognizable sound signal.

19 Claims, 26 Drawing Sheets

FIG. 4A INPUT SOUND SIGNAL 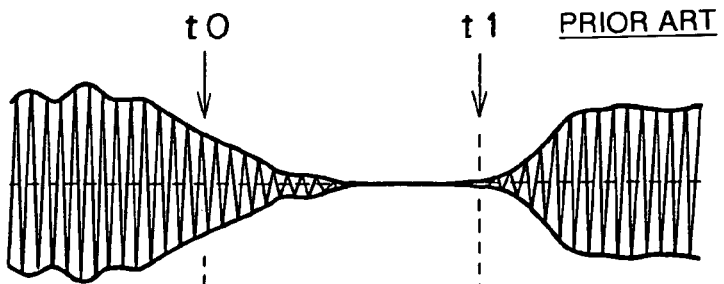 PRIOR ART
FIG. 4B LEVEL DETECTION VALUE E 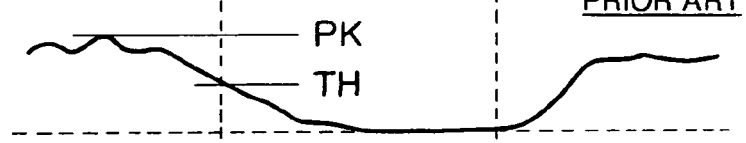 PRIOR ART
FIG. 4C CONTROL COEFFICIENT W (GAIN LEVEL)  PRIOR ART
FIG. 4D OUTPUT SOUND SIGNAL 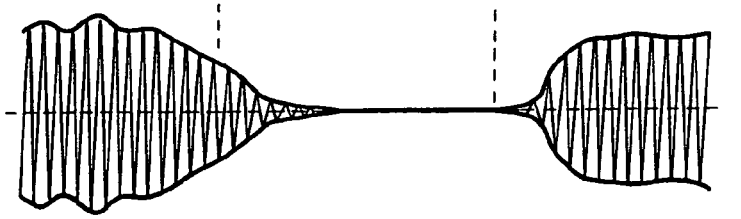 PRIOR ART

BEFORE PROCESSING

AFTER PROCESSING

INPUT SOUND SIGNAL (KA) (I)   (TE)  (KU) (DA) (SA)  (I)

OUTPUT SOUND SIGNAL

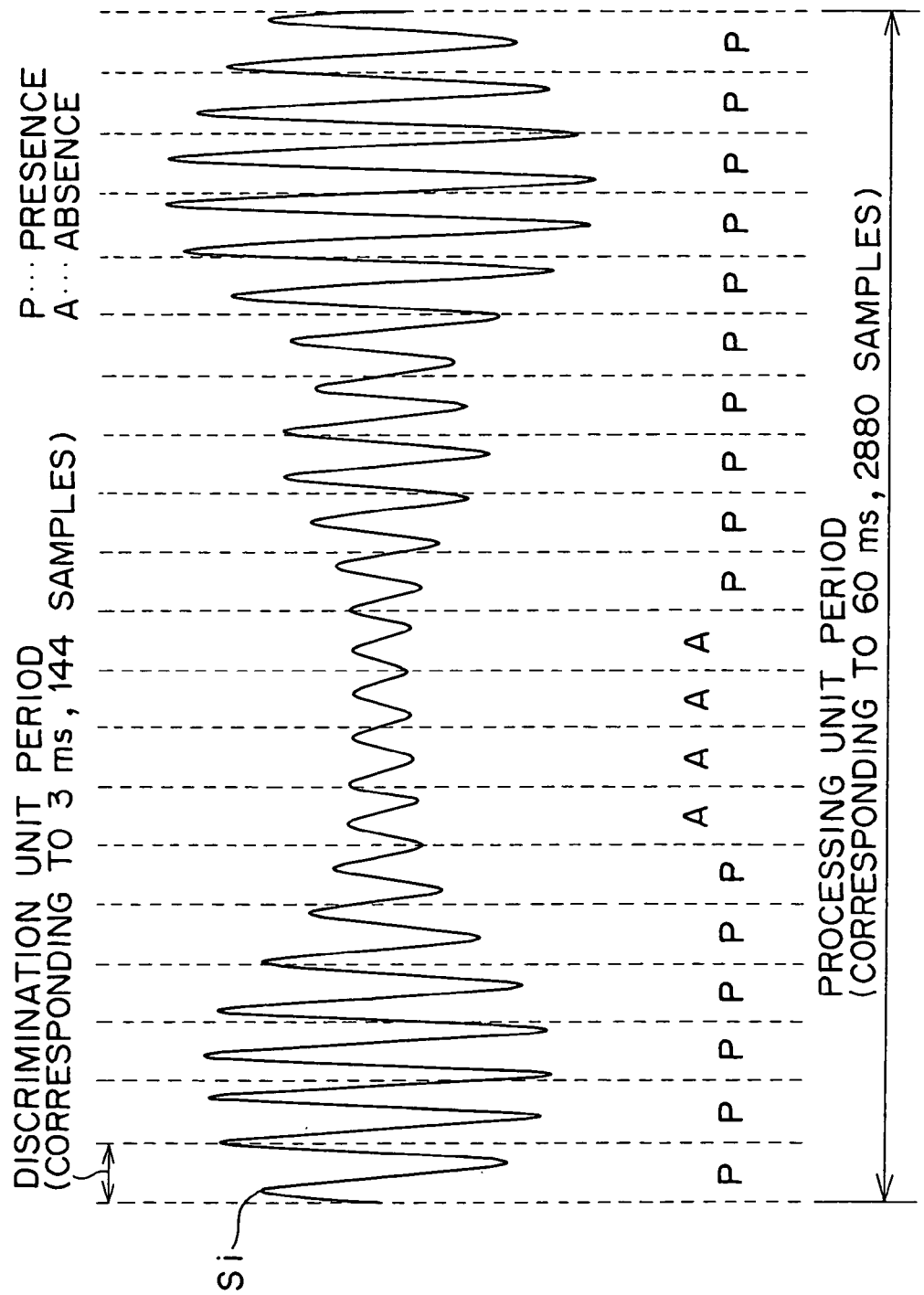

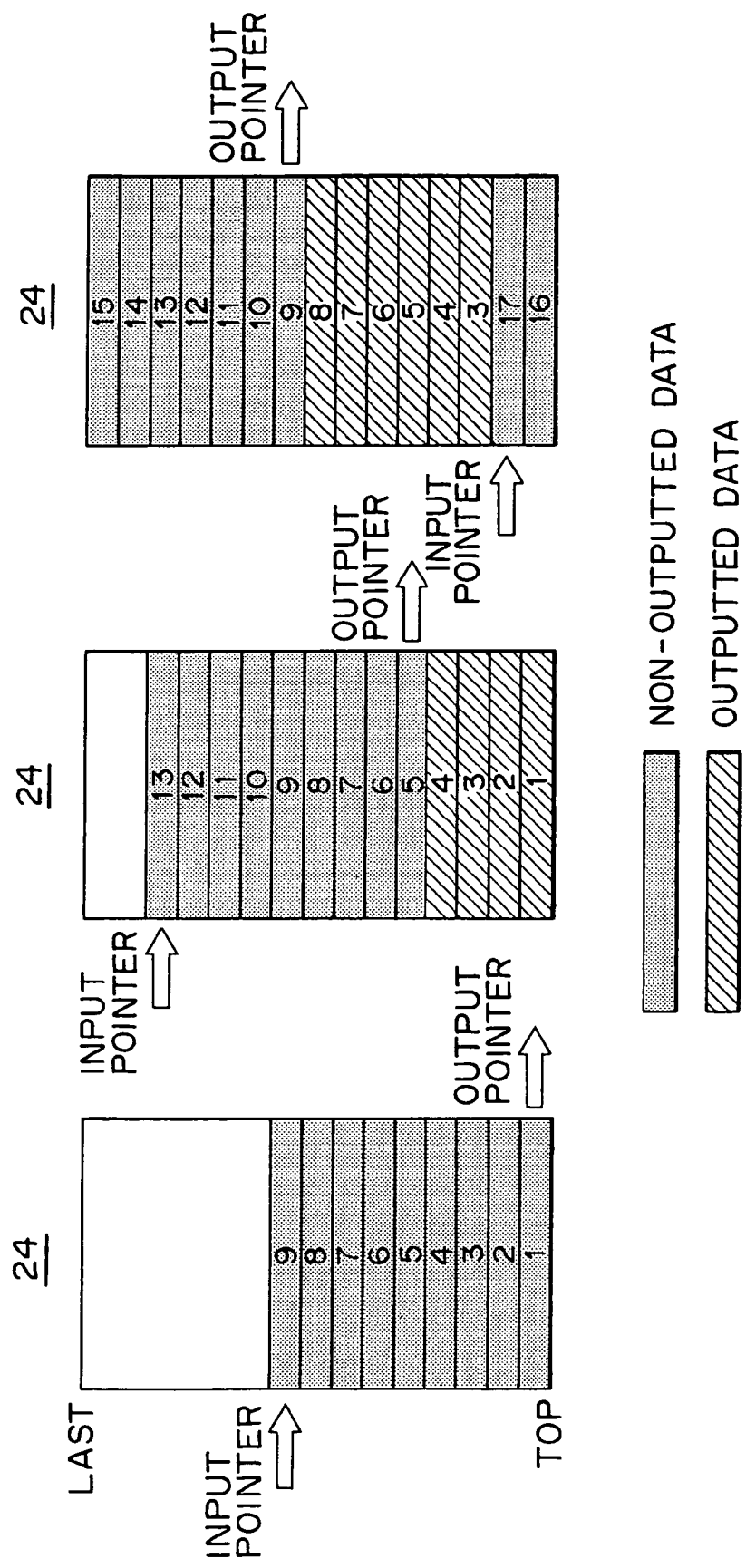

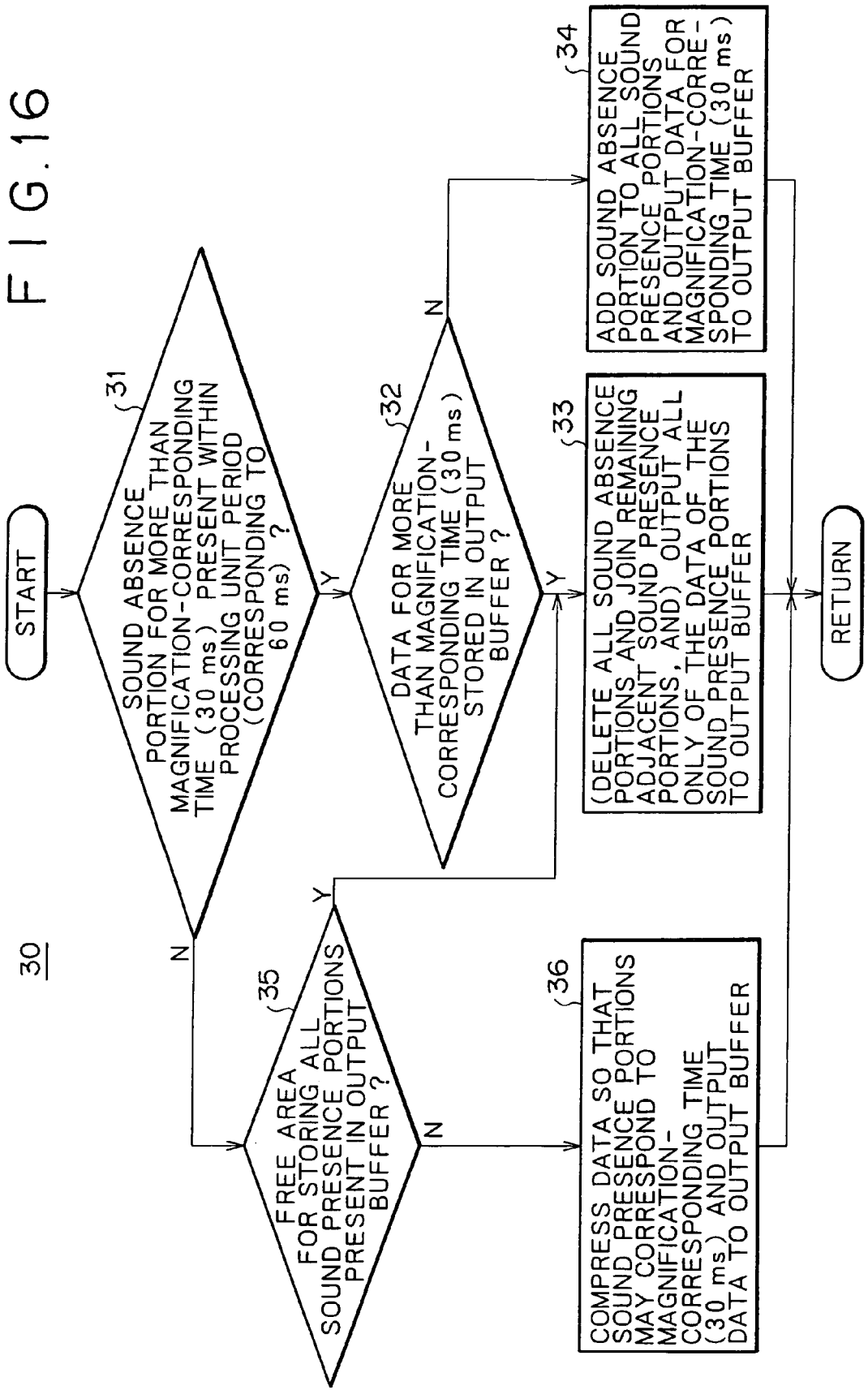

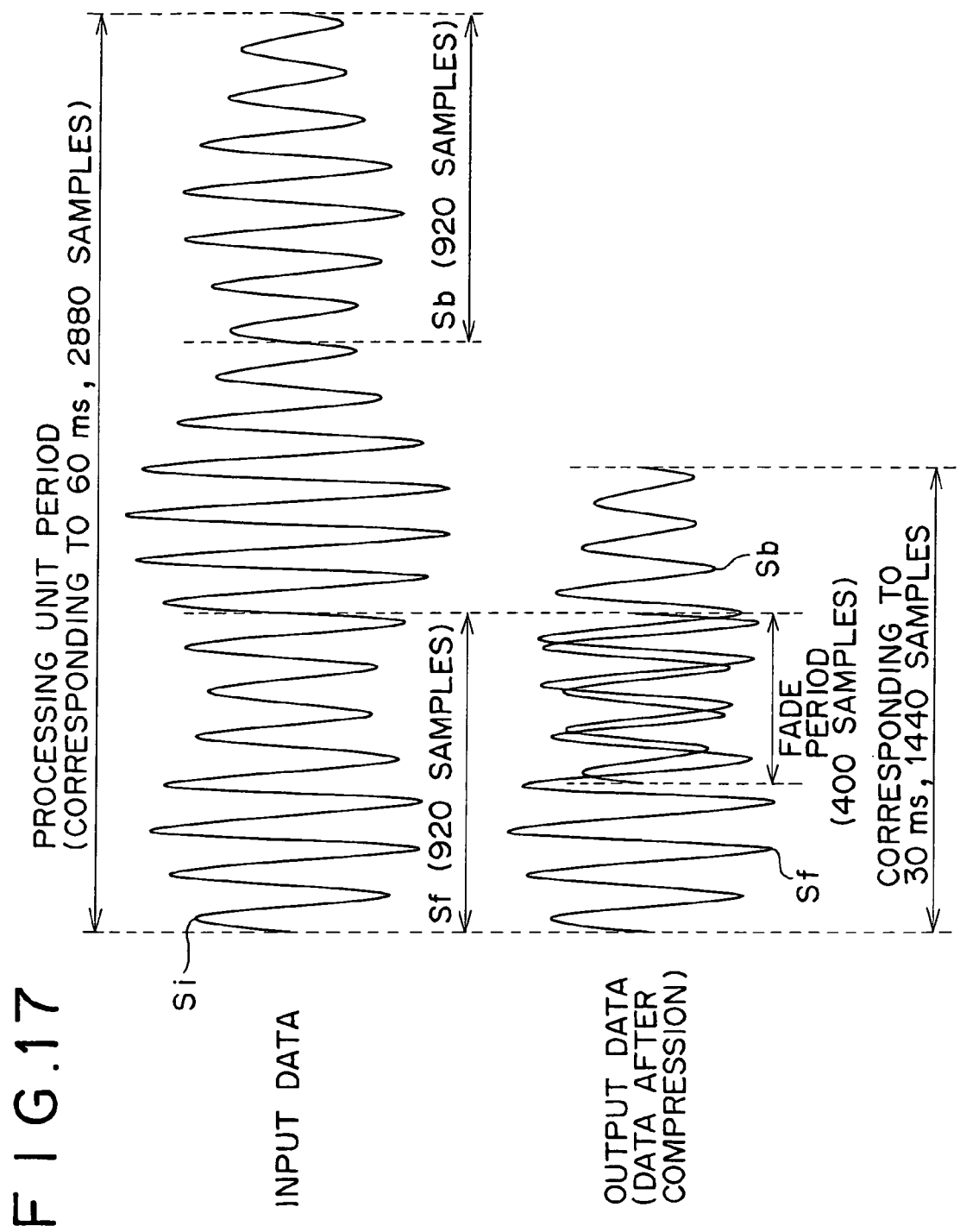

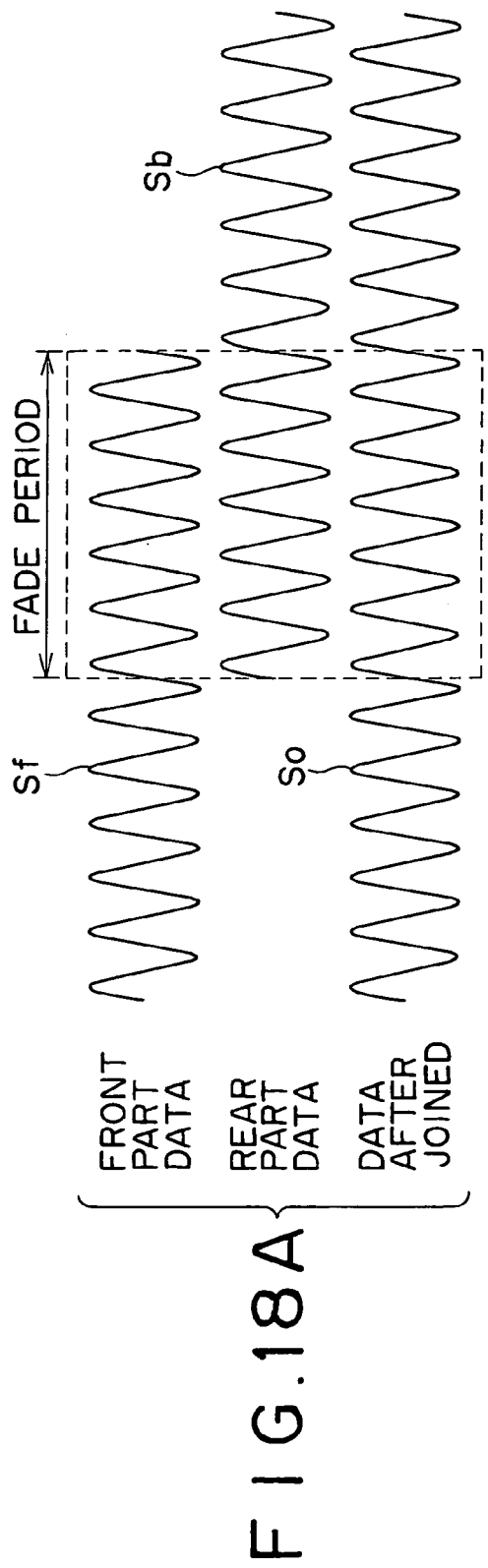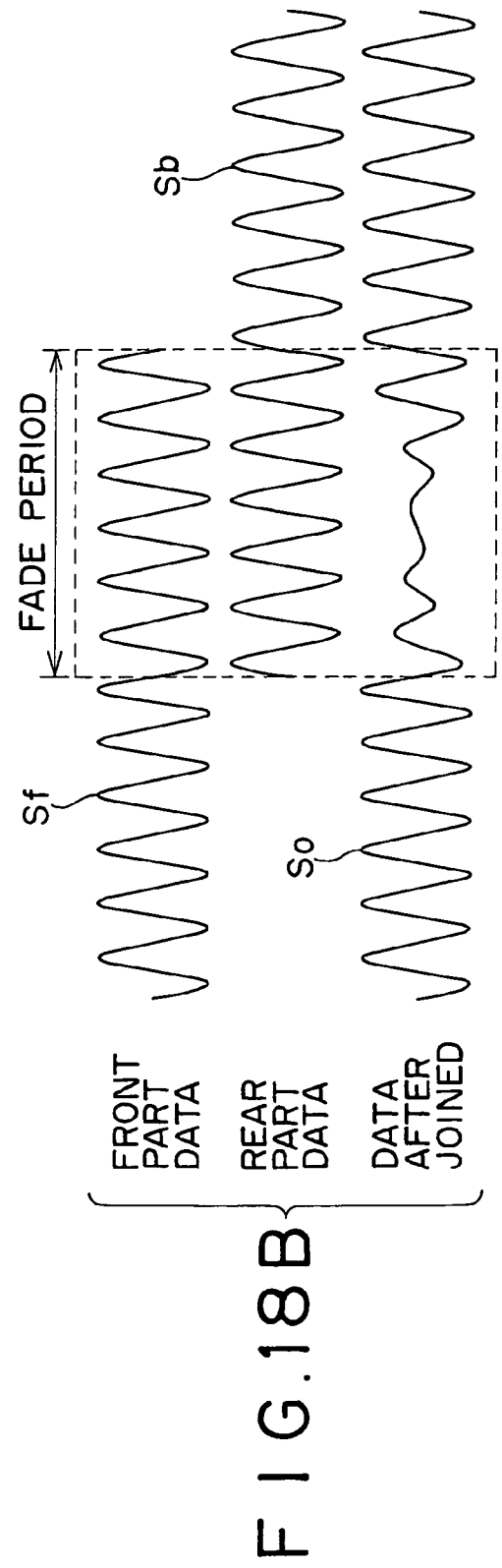

FIG. 25

```
         START
           │
           ▼
      ╱╲ 51
     ╱  ╲
    ╱ CHANGEOVER ╲
   ╱ POINT BETWEEN SOUND ╲
  ╱ ABSENCE PORTION AND SOUND ╲      N
 ╱ PRESENCE PORTION PRESENT WITHIN TIME ╲──────┐
╱ RANGE LONGER THAN TIME CORRESPONDING ╲       │
╲ TO 30 ms BUT SHORTER THAN TIME       ╱       │
 ╲ CORRESPONDING TO 100 ms FROM       ╱        │
  ╲ TOP OF PROCESSING               ╱          │
   ╲ UNIT PERIOD                   ╱           │
    ╲          ?                  ╱            │
     ╲                           ╱             │
      ╲╱                                       │
       │ Y                                     │
       ▼                                       ▼
   ┌─────────────────────┐          ┌─────────────────────┐
   │ SET CHANGEOVER POINT│  52      │ SET POINT AT WHICH  │  53
   │ BETWEEN SOUND       │          │ SOUND AVERAGE LEVEL │
   │ ABSENCE PORTION AND │          │ IS MINIMUM AS LAST  │
   │ SOUND PRESENCE      │          │ OF PROCESSING       │
   │ PORTION AS LAST OF  │          │ UNIT PERIOD         │
   │ PROCESSING UNIT     │          │                     │
   │ PERIOD              │          │                     │
   └─────────┬───────────┘          └──────────┬──────────┘
             │                                 │
             ▼                                 │
         ┌────────┐                            │
         │ RETURN │◄───────────────────────────┘
         └────────┘
```

50

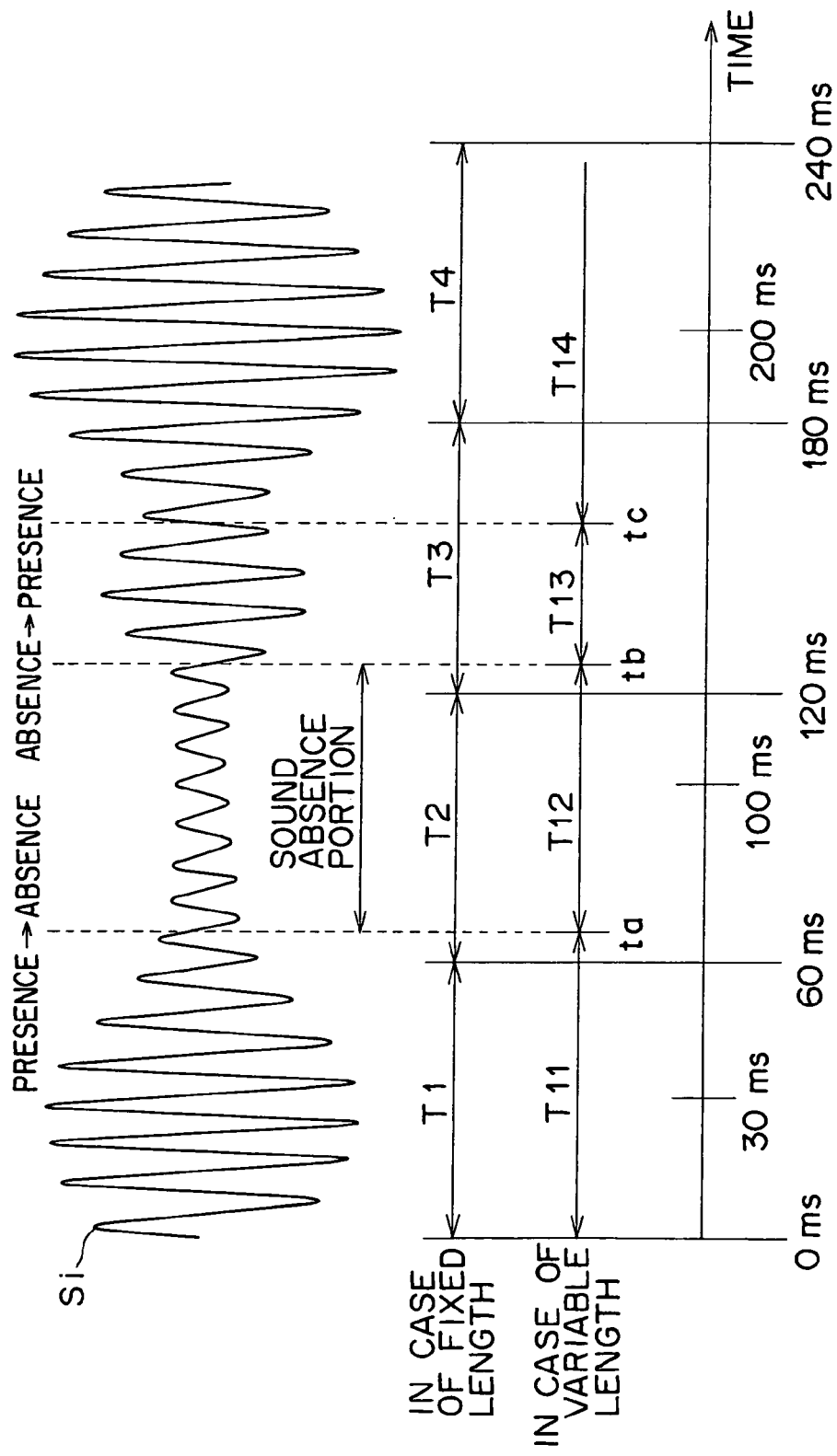

SOUND REPRODUCTION METHOD AND SOUND REPRODUCTION APPARATUS

BACKGROUND OF THE INVENTION

This invention relates to an apparatus for recording and reproducing a video signal and a sound signal such as a video tape recorder or an apparatus for recording and reproducing a sound signal such as a mini disk player, and more particularly to a method and an apparatus for use with an apparatus of the type mentioned by which a sound signal recorded on a recording medium is reproduced at a speed higher than a normal speed from the recording medium.

A video tape recorder for home use has been proposed wherein, when a video signal and a sound signal recorded on a tape are reproduced at a speed such as a double speed higher than a normal speed in order to shorten a reproduction time, an original reproduction sound signal is periodically patched while a sound absence portion thereof is deleted preferentially so that sound may be heard at the normal speed.

With the conventional sound reproduction method described above, however, since an original reproduction sound signal is periodically deleted, where a sound absence portion is not included at a fixed rate in the original reproduction sound signal, sound presence portions are deleted. Consequently, the reproduction sound signal after patched provides such intermittent sound that the hearing person cannot recognize contents of the reproduction sound signal.

Further, also in such a case that some sound absence portions are included in an original reproduction sound signal and the reproduction sound signal can be patched without deleting any sound presence portion, a sound absence portion is shortened and two adjacent sound presence portions come so close to each other that they may sound as different sound. For example, if a sound absence portion which precedes a close consonant like "k" becomes short, then "a-ka" sounds like "a-ga".

SUMMARY OF THE INVENTION

It is an object of the present invention to provide a sound reproduction method and a sound reproduction apparatus by which, when a sound signal reproduced at a speed higher than a normal speed in order to shorten a reproduction time is outputted at a normal musical interval or tone, occurrence of interruption of sound by deletion of a sound presence portion is reduced to facilitate recognition of contents of the sound signal.

It is another object of the present invention to provide a sound reproduction method and a sound reproduction apparatus by which, when a sound signal reproduced at a speed higher than a normal speed in order to shorten a reproduction time is outputted in a normal musical interval, occurrence of such a phenomenon that continuous sound portions sound differently by close joining of them is reduced.

In order to attain the objects described above, according to an aspect of the present invention, there is provided a sound reproduction method, comprising the steps of delimiting a reproduction input sound signal obtained by reproducing, from a recording medium, a sound signal recorded on the recording medium at a speed higher than a normal speed into successive processing unit periods, deleting a sound absence portion or portions of the reproduction input sound signal in order to reduce a sound data to reproduce the sound signal in shorter time than a normal reproducing time within a range within which a reproduction output sound signal of an amount corresponding to that at the normal speed is obtained from an output buffer to join sound presence portions of the reproduction input sound signal which precede and follow the sound absence portion or portions to obtain a joined reproduction input sound signal for each processing unit period, partly deleting, if a sound presence portion or portions of an amount which cannot be stored into the output buffer are included in the reproduction input sound signal of any of the processing unit periods, the sound presence portion or portions to join sound presence portions which precede and follow the sound absence portion or portions and compressing the reproduction input sound signal of the processing unit period to obtain a compressed reproduction input sound signal of the processing unit period, and writing the joined reproduction input sound signal or the compressed reproduction input signal for each processing unit period into the output buffer.

The sound reproduction method is carried out by a sound reproduction apparatus, comprising a processing unit period setting section for setting successive processing unit periods for speed conversion processing to be performed for a reproduction input sound signal obtained by reproducing, from a recording medium, a sound signal recorded on the recording medium at a speed higher than a normal speed, an output buffer for obtaining a reproduction output sound signal, and a speed conversion processing section for deleting a sound absence portion or portions of the reproduction input sound signal in order to reduce a sound data to reproduce the sound signal in shorter time than a normal reproducing time within a range within which a reproduction output sound signal of an amount corresponding to that at the normal speed is obtained from the output buffer to join sound presence portions of the reproduction input sound signal which precede and follow the sound absence portion or portions to obtain a joined reproduction input sound signal for each processing unit period, partly deleting, if a sound presence portion or portions of an amount which cannot be stored into the output buffer are included in the reproduction input sound signal of any of the processing unit periods, the sound presence portion or portions to join sound presence portions which precede and follow the sound presence portion or portions and compressing the reproduction input sound signal of the processing unit period to obtain a compressed reproduction input sound signal of the processing unit period, and writing the joined reproduction input sound signal or the compressed reproduction input signal for each processing unit period into the output buffer.

With the sound reproduction method and the sound reproduction apparatus, when a sound signal reproduced at a speed higher than a normal speed in order to shorten the reproduction time is outputted with a normal musical interval, since the output buffer is utilized effectively, otherwise possible interruption of sound caused by deletion of a sound presence portion is reduced thereby to facilitate recognition of contents of the audio signal by using only a memory of a necessary but minimum capacity.

According to another aspect of the present invention, there is provided a sound reproduction method, comprising the steps of suppressing an amplitude of a termination portion of each continuous sound portion of a reproduction input sound signal obtained by reproducing, from a recording medium, a sound signal recorded on the recording medium at a speed higher than a normal speed into successive processing unit periods, delimiting the reproduction input sound signal after the amplitude suppression processing into successive processing unit periods, deleting a sound absence portion or portions of the reproduction input sound signal within a range within which a reproduction output sound signal of an amount corresponding to that at the normal speed is obtained from an output buffer to join sound presence portions of the reproduction input sound signal which precede and follow the sound absence portion or portions to obtain a joined reproduction input sound signal for each processing unit period, partly deleting, if a sound presence portion or portions of an amount which cannot be stored into the output buffer are included in the reproduction input sound signal of any of the processing unit periods, the sound presence portion or portions to join sound presence portions which precede and follow the sound absence portion or portions and compressing the reproduction input sound signal of the processing unit period to obtain a compressed reproduction input sound signal of the processing unit period, and writing the joined reproduction input sound signal or the compressed reproduction input signal for each processing unit period into the output buffer.

The sound reproduction method is carried out by a sound reproduction method, comprising an amplitude suppression processing section for suppressing an amplitude of a termination portion of each continuous sound portion of a reproduction input sound signal obtained by reproducing, from a recording medium, a sound signal recorded on the recording medium at a speed higher than a normal speed into successive processing unit periods, a processing unit period setting section for setting successive processing unit periods for speed conversion processing to be performed for the reproduction input sound signal after the amplitude suppression processing, an output buffer for obtaining a reproduction output sound signal, and a speed conversion processing section for deleting a sound absence portion or portions of the reproduction input sound signal within a range within which a reproduction output sound signal of an amount corresponding to that at the normal speed is obtained from the output buffer to join sound presence portions of the reproduction input sound signal which precede and follow the sound absence portion or portions to obtain a joined reproduction input sound signal for each processing unit period, partly deleting, if a sound presence portion or portions of an amount which cannot be stored into the output buffer are included in the reproduction input sound signal of any of the processing unit periods, the sound presence portion or portions to join sound presence portions which precede and follow the sound presence portion or portions and compressing the reproduction input sound signal of the processing unit period to obtain a compressed reproduction input sound signal of the processing unit period, and writing the joined reproduction input sound signal or the compressed reproduction input signal for each processing unit period into the output buffer.

With the sound reproduction method and the sound reproduction apparatus, when a sound signal reproduced at a speed higher than a normal speed in order to shorten the reproduction time is outputted with a normal musical interval, since the output buffer is utilized effectively, otherwise possible interruption of sound caused by deletion of a sound presence portion is reduced thereby to facilitate recognition of contents of the audio signal by using only a memory of a necessary but minimum capacity. Furthermore, such a situation that continuous sound presence portions sound differently as a result of close joining of them is reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4A to 4D are graphs illustrating operation of the amplitude suppression processing section of FIG. 3;

FIG. 14 is a waveform diagram illustrating an example of discrimination of a sound presence portion and a sound absence portion by a sound presence/absence discrimination section of the sound processing section of FIG. 2;

FIGS. 15A to 15C are diagrammatic views illustrating operation of input/output pointers of an output buffer of the sound processing section of FIG. 2;

FIG. 16 is a flow chart illustrating an example of a speed conversion processing routine which is executed by a speed conversion processing section of the sound processing section of FIG. 2;

FIG. 17 is a waveform diagram illustrating an example of data compression which is executed by the speed conversion processing section of the sound processing section of FIG. 2;

FIGS. 18A and 18B are waveform diagrams illustrating adjustment methods when position adjustment is not performed upon data compression;

FIG. 25 is a flow chart illustrating an example of a sound level correspondence process unit length setting processing routine which is executed by a processing unit period setting section of the speech processing section of FIG. 24;

FIG. 26 is a diagrammatic view illustrating a process wherein a point at which the sound level is low is determined as a breakpoint for a process unit period of a speed conversion process;

DESCRIPTION OF THE PREFERRED EMBODIMENT

Figure 1:
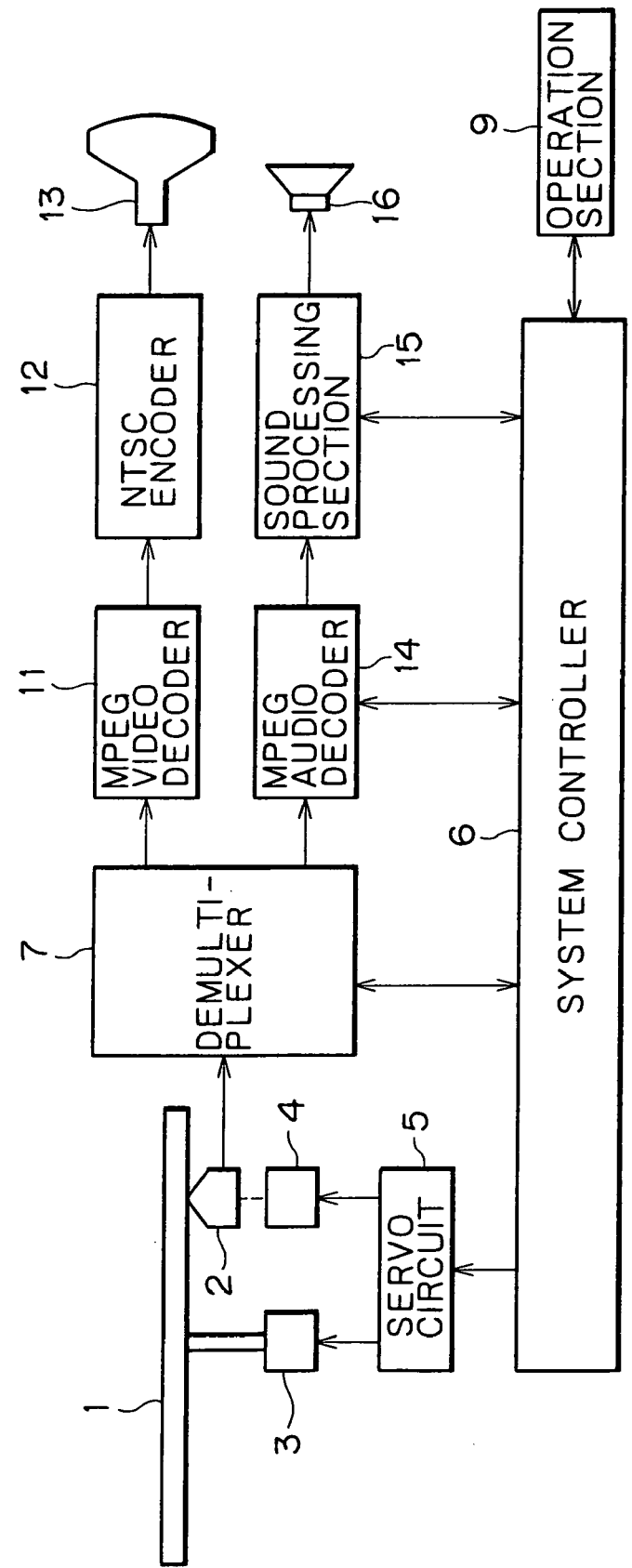
FIG. 1 is a block diagram showing an example of a reproduction apparatus to which the present invention is applied.
Figure 2:
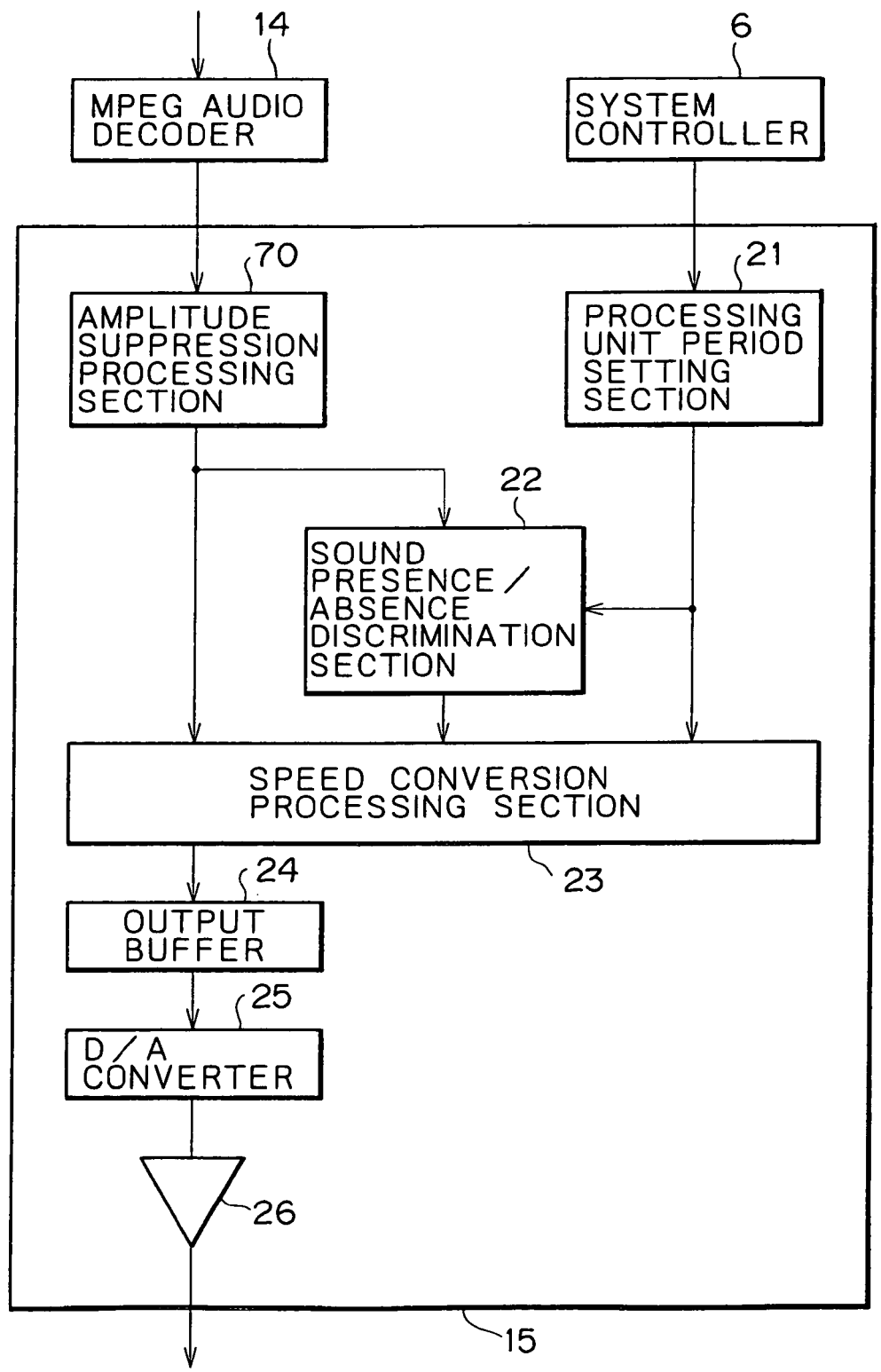
FIG. 2 is a block diagram showing a form of a speech processing section of the reproduction apparatus of FIG. 1.

[Embodiment of the Sound Reproduction Apparatus . . . FIGS. 1 and 2]

Referring first to FIG. 1, there is shown a reproduction apparatus to which the present invention is applied. The reproduction apparatus is generally constructed such that it can reproduce, from a recording medium in the form of a disk such as a hard disk, a magneto-optical disk or an optical disk, a video signal and a sound signal recorded on the recording medium at a speed higher than a normal speed.

The reproduction apparatus may additionally have a recording function, and practically, it is preferable that the reproduction apparatus additionally has a recording function. However, since a conventional recording method and apparatus may be used for the recording function, description of the same is omitted, and it is presupposed that the reproduction apparatus uses a recording medium 1 on which a video signal and a sound signal in the form of digitized (digital) signals are recorded in accordance with a predetermined protocol and format.

In the following description, it is presupposed that video data and sound data compressed in accordance with a compression coding method and a multiplexing method of the MPEG (Moving Picture Experts Group)-2 Systems are multiplexed and recorded as a TS (Transport Stream) on the recording medium 1 and that the sampling frequency of the sound signal is 48 kHz (2,880 samples per 60 ms (milliseconds)).

The recording medium 1 is driven to rotate by a drive motor 3. A reproduction head 2 reads, from the recording medium 1, a video signal and a sound signal recorded on the recording medium 1, and is a magnetic head or/and an optical pickup. The reproduction head 2 is moved in a radial direction of the recording medium 1 by a feed mechanism including a drive motor 4. The drive motors 3 and 4 are controlled by a servo circuit 5, which is in turn controlled by a system controller 6 which controls the entire apparatus.

A video signal and a sound signal read from the recording medium 1 and obtained as an output of the reproduction head 2, that is, in the present reproduction apparatus, video data and sound data multiplexed as a transport stream, are supplied to a demultiplexer 7, from which they are outputted separately as a video PES (Packetized Elementary Stream) and a sound PES, respectively.

The video data from the demultiplexer 7 are decompressed and decoded and then sampled out in a unit of a frame or a field in response to a reproduction magnification by an MPEG video decoder 11.

In particular, upon double speed reproduction, video data are read from the recording medium 1 at a speed equal to twice a normal speed, and the MPEG video decoder 11 samples out the video data of one frame per two successive frames or one field per two successive fields. Upon triple speed reproduction, video data are read from the recording medium 1 at a speed equal to three times the normal speed, and the MPEG video decoder 11 samples out the video data of two frames per three successive frames or two fields per three successive fields.

The video data of the output of the MPEG video decoder 11 are encoded into an NTSC (National Television System Committee) video signal and then converted into an analog signal by an NTSC encoder 12. The analog signal is supplied to a display unit 13 which may be a CRT display unit or a liquid crystal display unit.

The sound data from the demultiplexer 7 are decompressed and decoded by an MPEG audio decoder 14 and supplied to a sound processing section 15, by which it is converted in speed as hereinafter described so that the sampling frequency is changed to 48 kHz mentioned hereinabove irrespective of the reproduction magnification and then is converted into an analog signal. The analog signal is supplied to a sound outputting apparatus 16 such as a speaker.

In particular, upon double speed reproduction, since sound data are read at a speed equal to twice the normal speed from the recording medium 1, the sound data of the output of the MPEG audio decoder 14 include 2×2,880 samples for 60 ms. However, as a result of the speed conversion by the sound processing section 15, the sound data of the output of the sound processing section 15 include 2,880 samples for 60 ms. In the case of triple speed reproduction, sound data are read at a speed equal to three times the normal speed from the recording medium 1, and the sound data of the output of the MPEG audio decoder 14 include 3×2,880 samples for 60 ms. However, as a result of the speed conversion by the sound processing section 15, the sound data of the output of the sound processing section 15 include 2,880 samples for 60 ms.

An operation section 9 is connected to the system controller 6. The operation section 9 is manually operated by a user to perform various operations such as inputting an instruction of a reproduction magnification. The operation section 9 includes a display section such as a liquid crystal display section for displaying an operation state of the apparatus or an operation by a user.

FIG. 2 shows a form of the sound processing section 15. Referring to sound data of the output of the MPEG audio decoder 14, the sound processing section 15 of the form shown suppresses the amplitude of a termination portion of a continuous sound portion (a lump of sound or a sound portion which makes a lump) and makes a processing unit time for speed conversion processing fixed as pre-processing of speed conversion. To this end, the sound processing section 15 includes an amplitude suppression processing section 70, a processing unit period setting section 21, a sound presence/absence discrimination section 22, a speed conversion processing section 23, an output buffer 24, a D/A converter 25 and a sound amplifier 26.

[Amplitude Suppression Process . . . FIGS. 3 to 12]

The amplitude suppression processing section 70 of the sound processing section 15 of the form of FIG. 2 suppresses the amplitude of sound data of the output of the MPEG audio decoder 14 at a termination portion of a continuous sound portion.

(First Example of the Amplitude Suppression Process . . . FIGS. 3 to 6)

As one of methods of the amplitude suppression process by the amplitude suppression processing section 70, the method disclosed in Japanese Patent Laid-Open No. hei 8-179792 can be used. The amplitude suppression process according to the method disclosed in the document just mentioned is described with reference to FIGS. 3 to 6.

Figure 3:
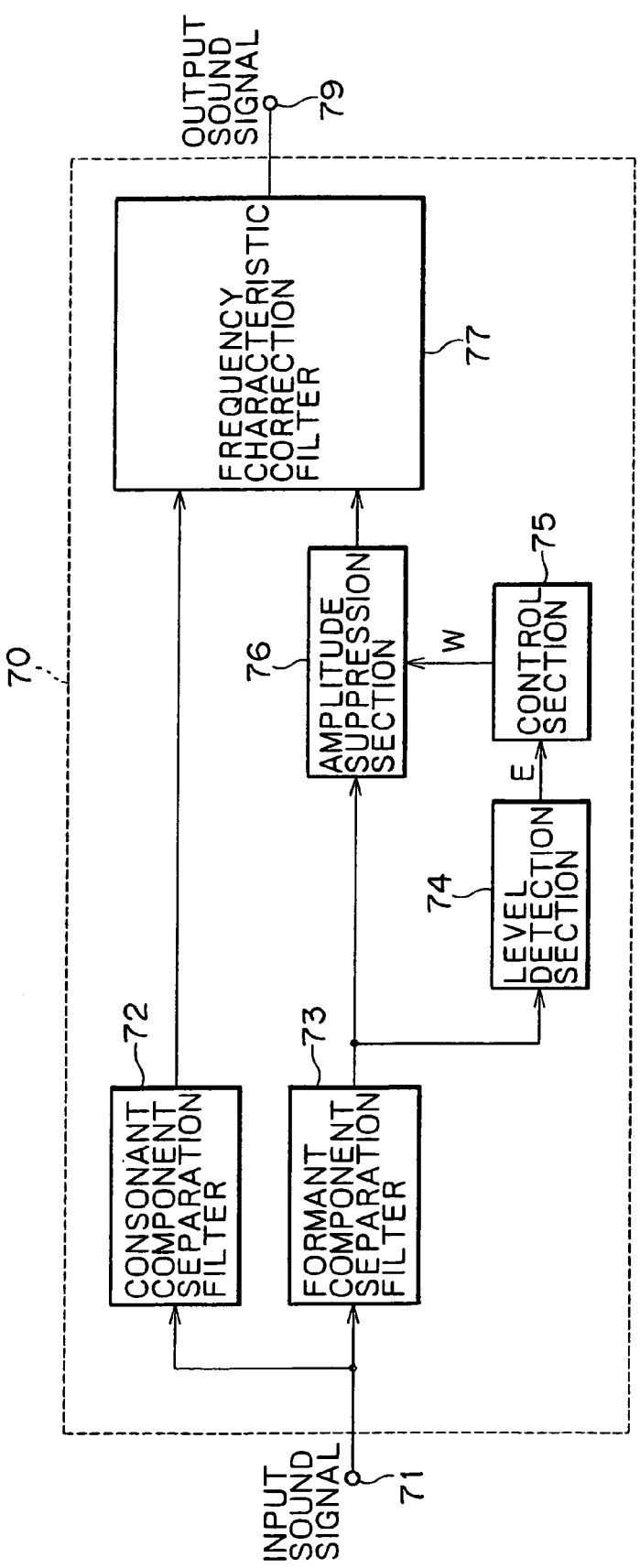
FIG. 3 is a block diagram showing an example of an amplitude suppression processing section shown in FIG. 2.

FIG. 3 shows a construction of the amplitude suppress ion processing section 70. Referring first to FIG. 3, sound data of an output of the MPEG audio decoder 14 described above are inputted as an input sound signal to an input terminal 71 of the amplitude suppression processing section 70. The input sound signal is supplied to a consonant component separation filter 72 and a formant component separation filter 73, and consonant components in the input sound signal are extracted by and outputted from the consonant component separation filter 72. Meanwhile, where the pass-band of the formant component separation filter 73 is set, for example, to 150 to 1,000 Hz, a pitch component and a formant component in the input sound signal are extracted by and outputted from the formant component separation filter 73.

The output of the formant component separation filter 73 is supplied to a level detection section 74, by which the output of the formant component separation filter 73 is, for example, full-wave rectified. A rectification output then is supplied to a low-pass filter whose pass-band is 60 Hz or less, and a level of an output of the low-pass filter is detected thereby to detect a sound level of the input sound signal and thus obtain a level detection value E. Where the sound level is detected only from the pitch component and the formant component in this manner, the resulting level detection value E has a minimized influence of noise.

The level detection value E from the level detection section 74 is processed in such a manner as hereinafter described by a control section 75, and a control coefficient W as a control signal for amplitude suppression is outputted from the control section 75.

Then, the output of the formant component separation filter 73 and the control coefficient W from the control section 75 are supplied to an amplitude suppression section 76, by which the output of the formant component separation filter 73 is attenuated with the control coefficient W as hereinafter described.

Further, a frequency characteristic correction filter 77 mixes the output of the consonant component separation filter 72 and an output of the amplitude suppression section 76 and performs a required frequency characteristic correction process such as equalizing processing for a signal obtained by the mixture. An output sound signal after the processing by the frequency characteristic correction filter 77 is obtained at an output terminal 79 of the amplitude suppression processing section 70. The frequency characteristic correction filter 77 has a filter coefficient and a processing band set in response to a reproduction magnification for higher speed reproduction. However, the output of the consonant component separation filter 72 and the output of the amplitude suppression section 76 may be merely mixed without performing the correction of the frequency characteristic by the frequency characteristic correction filter 77.

The control section 75 predicts from the level detection value E received from the level detection section 74 that the termination of a continuous sound portion is approaching and detects a start point of a next continuous sound portion. Then, the control section 75 sets the control coefficient W for the amplitude suppression section 76 based on the prediction and the detection and, if the termination of the continuous sound portion comes near, then the control section 75 attenuates the output of the formant component separation filter 73. Then, when the start point of a next continuous sound portion comes, then the control section 75 cancels the attenuation so that a period within which the amplitude is small or a sound absence portion is formed between adjacent continuous sound portions or else a sound absence portion between adjacent continuous sound portions is widened.

The process just described is illustrated in FIGS. 4A to 4D. In particular, FIG. 4A shows an input sound signal obtained at the input terminal 71 and having an analog waveform. FIG. 4B illustrates the level detection value E which is obtained at the level detection section 74 in this instance and has an analog waveform.

The control section 75 first detects a peak value PK of the level detection value E and sets a threshold value TH. For example, the control section 75 multiplies the peak value PK by a coefficient to obtain a value of a fixed rate to the peak value PK and sets the value as the threshold value TH. Then, the control section 75 compares the level detection value E(i) at the sampling timing with another level detection value E(i−1) at the immediately preceding sampling timing to discriminate whether the sound level is in an increasing tendency or a decreasing tendency. Further, the control section 75 compares the level detection value E(i) at the sampling timing described above with the threshold value TH set as described above.

Then, if the sound level is in a decreasing tendency and the level detection value E(i) then becomes lower than the threshold value TH as at a timing t0 of FIG. 4, then the control section 75 discriminates that the termination of the continuous sound portion is approaching the termination of the continuous sound and gradually decreases the control coefficient W for the amplitude suppression section 76 (that is, the gain level of the amplitude suppression section 76) from its maximum value 1 to the minimum value 0 as seen from FIG. 4C to gradually increase the attenuation amount of the output of the formant component separation filter 73.

Then, if, after such amplitude suppression, the sound level changes over to an increasing tendency as at a timing t1 of FIG. 4A, then the control section 75 discriminates that this is the start point of the next continuous sound portion and gradually increases the control coefficient W for the amplitude suppression section 76 (that is, the gain level of the amplitude suppression section 76) from the minimum value 0 toward the maximum value 1 as seen from FIG. 4C to gradually decrease the attenuation amount of the output of the formant component separation filter 73.

An output sound signal obtained at the output terminal 79 as a result of such an amplitude suppression process as described above has a period within which the amplitude is small or a sound absence portion between adjacent continuous sound portions or else has a widened sound absence portion between adjacent continuous sound portions, as illustrated in an analog waveform of FIG. 4D.

Figure 5:
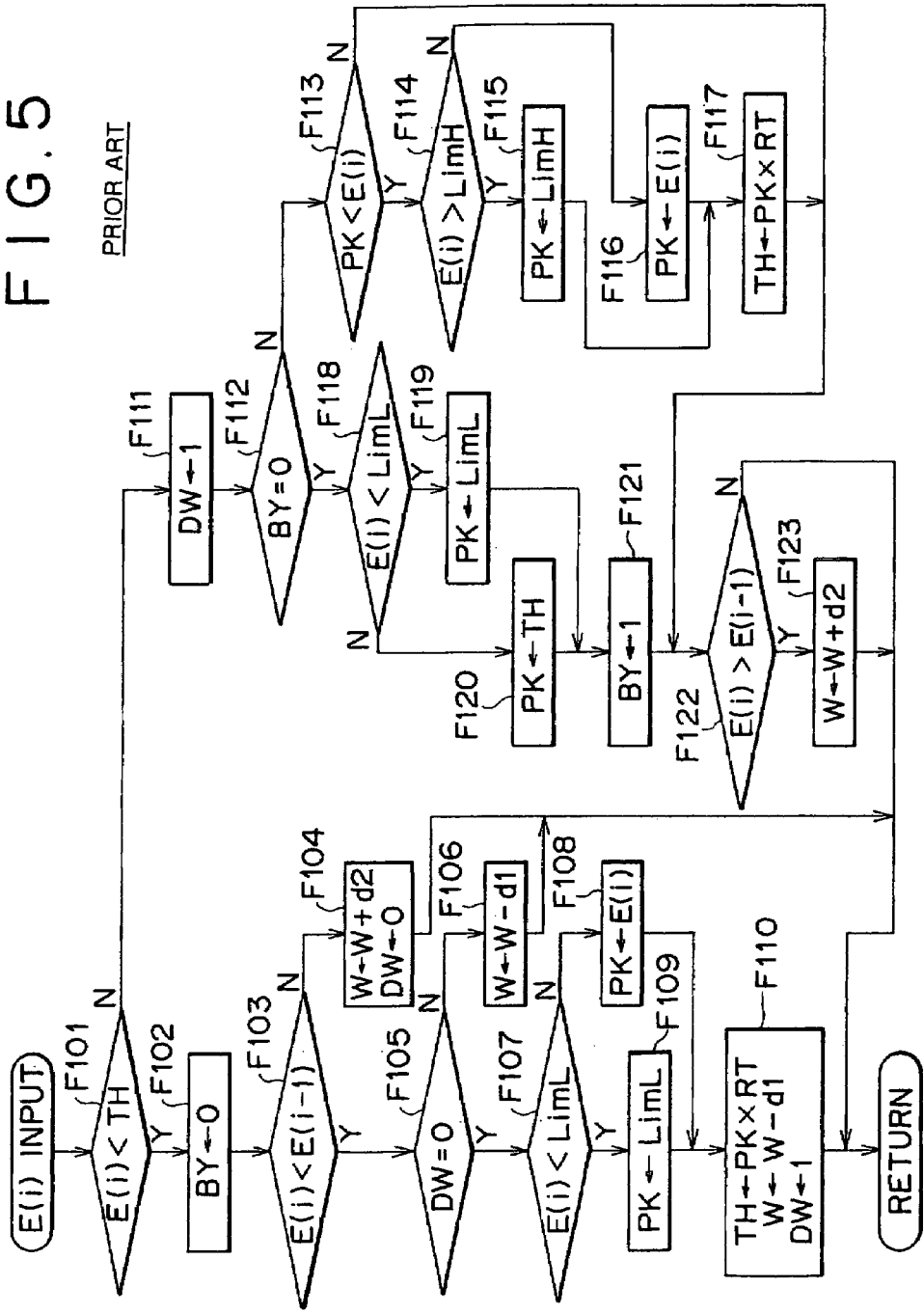
FIG. 5 is a flow chart illustrating an example of a processing routine which is executed by a control section of the amplitude suppression processing section of FIG. 3.

More specifically, the control section 75 executes such a processing routine as illustrated in FIG. 5 to set the control coefficient W for the amplitude suppression section 76.

Processing of the processing routine of FIG. 5 is started each time a level detection value E(i) is fetched from the level detection section 74 by the control section 75. Referring to FIG. 5, the control section 75 first compares the level detection value E(i) with the threshold value TH in step F101. The threshold value TH was set in such a manner as hereinafter described in step F110 or F117 of the processing routine when the processing routine was executed in the preceding cycle.

If E(i)≧TH, then the processing advances from step F101 to step F111, in which the control section 75 sets a down flag DW to 1. The down flag DW is a flag which is set to 1 when the sound level has been in a decreasing tendency or it is considered that the sound level has been in a decreasing tendency.

Then in step F112, the control section 75 confirms a flag BY. The flag BY is set to 0 in step F102 when the immediately preceding level detection value E(i−1) is lower than the threshold value TH. Accordingly, when a value higher than the threshold value TH is first inputted as the level detection value E(i), the flag BY is 0, and the processing advances from step F112 to step F118.

In step F118, the control section 75 compares the level detection value E(i) with a lower limit value LimL of the peak value PK. For the peak value PK, a higher limit value LimH and the lower limit value LimL are set in advance. If the peak value PK is higher than the higher limit value LimH, then the control section 75 sets the higher limit value LimH as the peak value PK, but if the peak value PK is lower than the lower limit value LimL, then the control section 75 sets the lower limit value LimL as the peak value PK so that the control section 75 sets the peak value PK to a value between the higher limit value LimH and the lower limit value LimL both inclusive as hereinafter described.

If E(i)<LimL in step F118, then the processing advances from step F118 to step F119, in which the control section 75 sets the lower limit value LimL as the peak value PK, whereafter the processing advances to step F121. On the other hand, if E(i)≧LimL in step F118, then the processing advances from step F118 to step F120, in which the control section 75 sets the threshold value TH as the peak value PK, whereafter the processing advances to step F121.

In step F121, the control section 75 sets the flag BY to 1 so that it indicates that the sound level is higher than the threshold value TH to make preparations for a case when a next level detection value E(i) is inputted.

Then in step F122, the control section 75 compares the level detection value E(i) then with the immediately preceding level detection value E(i−1). If E(i)>E(i−1), then the control section 75 discriminates that the sound level is in an increasing tendency, and advances the processing to step F123, in which the control section 75 updates the control coefficient W to the value of W+d2, whereafter the control section 75 enters a next cycle of processing. On the other hand, if E(i)≦E(i−1), then the control section 75 discriminates that the sound level is not in an increasing tendency, and advances the processing thereof from step F122 immediately to a next cycle of processing.

The processing advances from step F121 to step F122 when a value higher than the threshold value TH is inputted as the level detection value E(i) and the sound level is in an increasing tendency. Therefore, the control coefficient W is updated in step F123.

The parameter d2 is a step width by which the control coefficient W is to be increased and the attenuation amount is to be decreased. However, as seen from FIG. 4C, the control coefficient W is set to 0≦W≦1. Accordingly, when W=1, the control coefficient W is not updated in step F123.

If E(i)≧TH is discriminated also in the next processing cycle, then the processing advances from step F101 to step F111 and then to step F112. In this instance, however, a value higher than the threshold value TH is inputted but not first as the level detection value E(i) and the flag BY is set already to 1. Consequently, the processing now advances from step F112 to step F113.

In step F113, the control section 75 compares the level detection value E(i) with the peak value PK. If PK E(i), then the processing advances immediately to step F122, but if PK<E(i), then the processing advances to step F114. Consequently, the peak value PK is updated and also the threshold value TH is updated by processing in step F114 et seq.

In particular, first in step F114, the control section 75 compares the level detection value E(i) with the higher limit value LimH for the peak value PK. If E(i)>LimH, then the processing advances from step F114 to step F115, in which the control section 75 sets the higher limit value LimH as the peak value PK, whereafter the processing advances to step F117. On the other hand, if E(i)≦LimH in step F114, then since this signifies that the level detection value E(i) higher than the peak value PK is detected as a new peak value PK, the processing advances from step F114 to step F116, in which the control section 75 sets the level detection value E(i) as the peak value PK, whereafter the processing advances to step F117.

In step F117, the control section 75 updates the threshold value TH to a value PK×RT which is the fixed rate of the peak value PK updated as described above. The rate represented by the coefficient RT is selected to be several % to several tens %. After the threshold value TH is updated in step F117, the processing advances to step F122.

The processing when the level detection value E(i) is equal to or higher than the threshold value TH is such as described above. On the contrary, when the level detection value E(i) is lower than the threshold value TH, the processing advances from step F101 to step F102, in which the control section 75 sets the flag BY to 0.

Then in step F103, the control section 75 compares the level detection value E(i) then with the immediately preceding level detection value E(i−1). If E(i)<E(i−1) then the control section 75 discriminates that the sound level is in a decreasing tendency, and the processing advances from step F103 to step F105, in which the control section 75 confirms the down flag DW.

Then, if the down flag DW is 1, then since the sound level has formerly been in a decreasing tendency or it is considered that the sound level has been in a decreasing tendency, the control section 75 discriminates that the termination of the continuous sound portion is approaching from the facts that the level detection value E(i) is lower than the threshold value TH and that the level detection value E(i) is lower than the immediately preceding level detection value E(i−1), and advances the processing from step F105 to step F106. In step F106, the control section 75 updates the control coefficient W to W−d1. Thereafter, the control section 75 enters a next processing cycle.

The parameter d1 is a step width by which the control coefficient W is to be decreased to increase the attenuation amount. However, as seen from FIG. 4C, the control coefficient W is set to $0 \leq W \leq 1$. Accordingly, when the control coefficient W is W=0, it is not updated in step F106.

Thereafter, while the level detection value E(i) continues to decrease to the termination of the continuous sound portion, updating of the control coefficient W is repeated in step F106, and the gain level of the amplitude suppression section 76 is decreased gradually as seen from different points of time after time t0 of FIG. 4. Then, after the control coefficient W (gain level) reaches 0, the state wherein the control coefficient W (gain level) is 0 is maintained until the sound level thereafter changes over to an increasing tendency as seen from the time point t1.

On the other hand, if the control section 75 discriminates in step F105 that the down flag DW is 0, then this signifies that the sound level has not been in a decreasing tendency till then and a value lower than the threshold value TH has been inputted first as the level detection value E(i). In this instance, it is considered that, even if the sound level is in a decreasing tendency, the termination of the continuous sound portion may not possibly be approaching. Therefore, if it is discriminated in step F105 that the down flag DW is 0, then the processing advances to step F107 so that the peak value PK is updated and also the threshold value TH is updated in step F107 et seq.

In particular, first in step F107, the control section 75 compares the level detection value E(i) with the lower limit value LimL for the peak value PK. If E(i)≧LimL, then the processing advances from step F107 to step F108, in which the control section 75 sets the level detection value E(i) as the peak value PK, whereafter the processing advances to step F110. However, if E(i)<LimL in step F107, then the processing advances from step F107 to step F109, in which the control section 75 sets the lower limit value LimL as the peak value PK, whereafter the processing advances to step F110.

In step F110, the control section 75 updates the threshold value TH to a value PK×RT which is the fixed rate to the peak value PK updated in such a manner as described above. Further, in this instance, since the termination of the continuous sound portion may possibly be approaching, the control section 75 updates the control coefficient W to a value W−d1 similarly as in step F106. In step F110, the control section 75 sets the down flag DW to 1 so that it indicates that the sound level is in a decreasing tendency.

In this manner, when a value lower than the threshold value TH is first inputted as the level detection value E(i), the threshold value TH is updated in step F110 so that it is discriminated with a higher degree of accuracy whether or not the termination of a continuous sound portion is approaching. In other words, when the termination of a continuous sound portion is not actually approaching, since the probability that the level detection value E(i) inputted next may be higher than the updated threshold value TH is high and the possibility that the processing in step F111 et seq. may be executed by processing of the next cycle is high, the probability that it may be discriminated in error that the termination of a continuous sound portion is approaching is low.

On the contrary, when the termination of a continuous sound portion is approaching actually, the level detection value E(i) inputted next is lower than the updated threshold value TH and besides is lower than the directly preceding level detection value E(i−1). Consequently, the processing in a next processing cycle advances from step F105 to step F106, in which the process for suppressing the amplitude of a termination portion of the continuous sound portion is executed.

After the amplitude suppression, if the start point of a next continuous sound portion comes as seen from time t1 of FIG. 4, then the control section 75 discriminates in step F103 that the level detection value E(i) then is higher than the directly preceding level detection value E(i−1). Consequently, the processing advances from step F103 to step F104, in which the control section 75 updates the control coefficient W to a value W+d2 and sets the down flag DW to 0.

Thereafter, while the level detection value E(i) increases, updating of the control coefficient W is repeated in step F104 when the level detection value E(i) is lower than the threshold value TH or in step F123 when the level detection value E(i) is higher than the threshold value TH. Consequently, the gain level of the amplitude suppression section 76 gradually increases as seen from different points following the time point t1 of FIG. 4.

As described above, by the processing routine of FIG. 5, the output sound signal of the amplitude suppression processing section 70 has a period, within which the amplitude is small, or a sound absence portion formed between adjacent continuous sound portions or else has a widened sound absence portion between adjacent continuous sound portions.

Figure 6A:
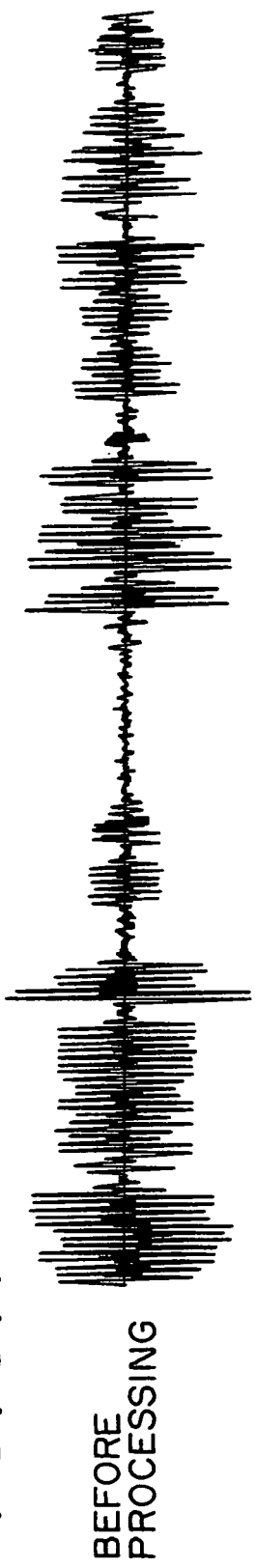
FIGS. 6A and 6B are waveform diagrams illustrating an example of speech signal waveforms before and after an amplitude suppression process of the amplitude suppression processing section of FIG. 3.
Figure 6B:
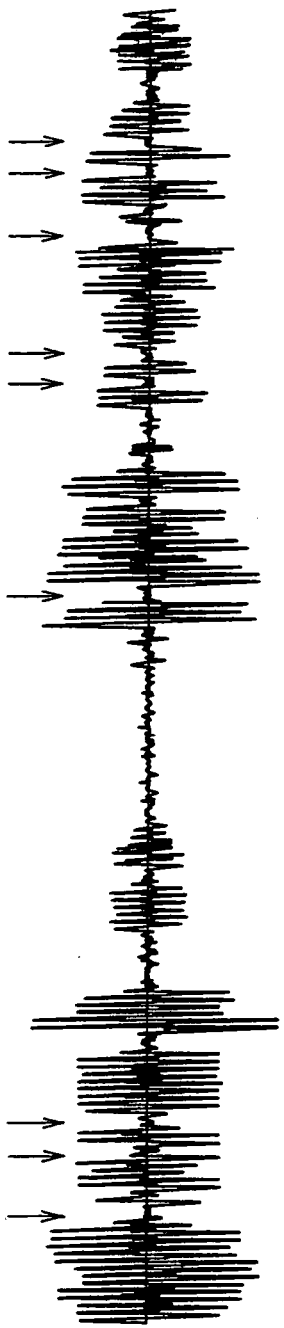

FIGS. 6A and 6B illustrate sound signal waveforms when a speaker utters "oyayuzuri no muteppo de kodomo no toki kara son bakari shite iru" in Japanese. FIG. 6A illustrates a waveform before the amplitude suppression process is performed, and FIG. 6B illustrates a waveform after the amplitude suppression process is performed. When the amplitude suppression process described above is performed, two successive uttered sounds (continuous sound portions) are delimited precisely by a period within which the amplitude is small or a sound absence portion as indicated by arrow marks in FIG. 6B and the uttered sounds can individually be recognized clearly.

(Second Example of the Amplitude Suppression Process—FIGS. 7 to 12)

As another example of the amplitude suppression process to be performed by the amplitude suppression processing section 70 of the sound processing section 15 of FIG. 2, the method disclosed in Japanese Patent Laid-Open No. hei 7-36487 can be used. The amplitude suppression process according to the method disclosed in the document just mentioned is illustrated in FIGS. 7 to 12.

Figure 7:
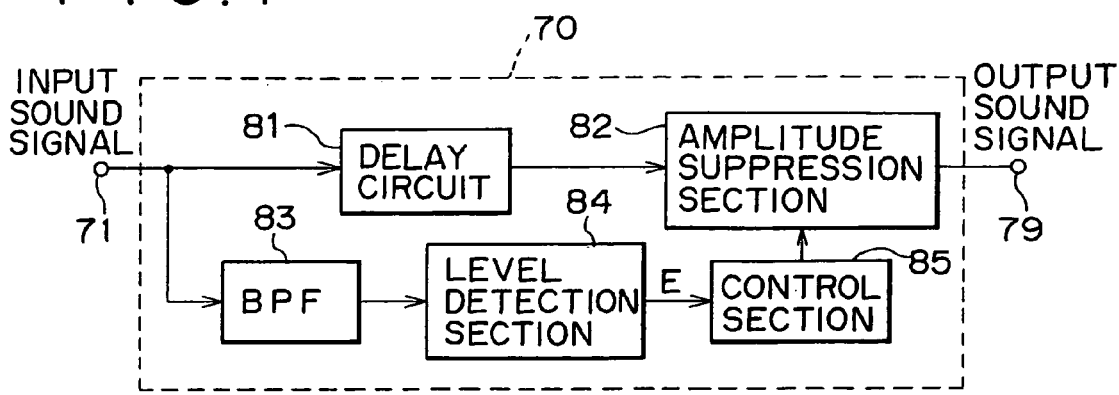
FIG. 7 is a block diagram showing another example of the amplitude suppression processing section of the reproduction apparatus of FIG. 1.
Figure 9:
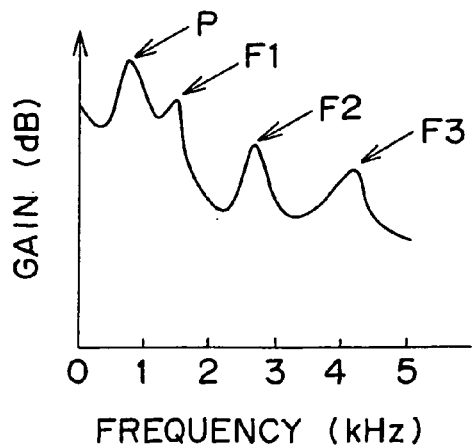
FIG. 9 is a graph illustrating operation of a band-pass filter of the amplitude suppression processing sections of FIGS. 7 and 8.

FIG. 7 shows a construction of the amplitude suppression processing section 70. Referring to FIG. 7, sound data of the output of the MPEG audio decoder 14 described hereinabove are supplied as an input sound signal to an input terminal 71 of the amplitude suppression processing section 70. The input sound signal is delayed, for example, by 30 ms by a delay circuit 81 and supplied to an amplitude suppression section 82. The input sound signal is supplied also to a band-pass filter 83, from which a pitch component and only a first formant component in the input sound signal are outputted.

Where sound of a conversation of a person is a vowel, it can be analyzed principally into a pitch component and formant components such as a first formant component and a second formant component. In particular, the sound power spectrum when, for example, "a" is uttered exhibits frequencies upon which energy is concentrated such as a pitch component P, a first formant component F1, a second formant component F2, a third formant component F3, . . . in an ascending order of the frequency as seen in FIG. 9.

Accordingly, if the upper side cutoff frequency of the band-pass filter 83 is selectively set to a frequency between the first formant component F1 and the second formant component F2, then only a pitch component and a first formant component can be extracted by the band-pass filter 83. However, since the frequencies of the components vary depending upon the sound uttered or the person who utters, the pass-band of the band-pass filter 83 should be modified a little based on a sound signal to be handled by the system.

The pitch component and the first formant component from the band-pass filter 83 are supplied to a level detection section 84. In the level detection section 84, the output of the band-pass filter 83 is full-wave rectified for example, and the rectification output is supplied to a low-pass filter whose pass-band is lower than 60 Hz. Then, the level of the output of the low-pass filter is detected to detect the sound level of the input sound signal, thereby obtaining a level detection value E. Where a sound level is detected only from a pitch component and a formant component in this manner, the level detection value E obtained has little influence of noise.

The level detection value E from the level detection section 84 is processed in such a manner as hereinafter described by a control section 85. Then, a sound signal of an output of the delay circuit 81 is attenuated in the amplitude suppression section 82 under the control of the control section 85 as hereinafter described, and an output signal after the amplitude suppression process is obtained at an output terminal 79 of the amplitude suppression processing section 70.

Figure 10:
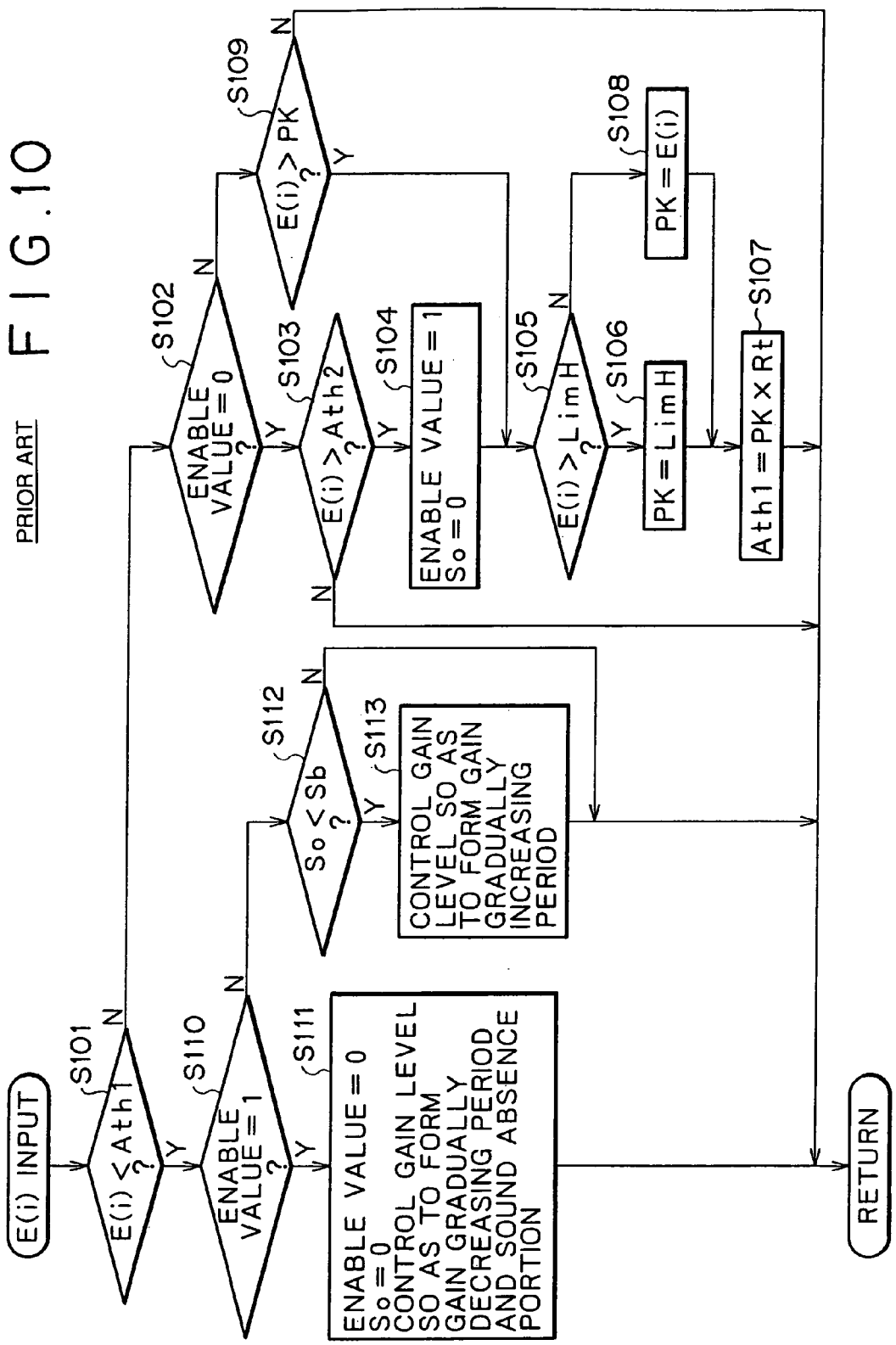
FIG. 10 is a flow chart illustrating an example of a processing routine which is executed by a control section of the amplitude suppression processing sections of FIGS. 7 and 8.

FIG. 10 illustrates an example of a processing routine to be executed by the control section 85 of the amplitude suppression processing section 70 shown in FIG. 7. Processing of the present processing routine is started each time a level detection value E(i) is fetched from the level detection section 84 into the control section 85. Referring to FIG. 10, first in step S101, the control section 85 compares the level detection value E(i) with a threshold value Ath1 for discrimination of interruption of sound. The threshold value Ath1 is a value which was set in such a manner as hereinafter described in step S107 of the processing routine which was executed in a preceding processing cycle.

If $E(i) \geq Ath1$ in step S101, then the processing advances from step S101 to step S102, in which the control section 85 discriminates whether or not an enable value is 0. The enable value is a value which indicates a state of the sound level in the preceding processing cycle and is 1 if the sound level exhibited an increase formerly.

Consequently, when the sound level begins to rise, the control section 85 discriminates in step S102 that the enable value is 0, and the processing advances from step S102 to step S103, in which the control section 85 compares the level detection value E(i) with another threshold value Ath2 for discrimination of presence of sound. The threshold value Ath2 is set in advance.

Then, if $E(i) \leq Ath2$ in step S103, the control section 85 enters processing of a next processing cycle. However, if E(i)>Ath2, the presence of sound is discriminated, then the processing advances to step S104, in which the control section 85 sets the enable value to 1 and sets a variable So, which indicates a number of samples after stopping of amplitude suppression to 0, whereafter the processing advances to step S105.

In step S105, the control section 85 compares the level detection value E(i) with a higher limit value LimH for the peak value PK. If E(i)>LimH, then the processing advances from step S105 to step S106, in which the control section 85 sets the higher limit value LimH as the peak value PK, whereafter the processing advances to step S107. On the other hand, if $E(i) \leq LimH$ in step S105, then the processing advances from step S105 to step S108, in which the control section 85 sets the level detection value E(i) as the peak value PK, whereafter the processing advances to step S107.

In step S107, the control section 85 updates the threshold value Ath1 for discrimination of interruption of sound to a value PK×Rt of a fixed rate to the peak value PK set in such a manner as described hereinabove. After the threshold value Ath1 is updated in step S107, the control section 85 enters processing of a next processing cycle.

On the other hand, if it is discriminated in step S102 that the enable value is 1, then the processing advances to step S109, in which the control section 85 compares the level detection value E(i) with the peak value PK. Then, if $E(i) \leq PK$ in step S109, then the processing advances to step S105 so that the control section 85 updates the peak value PK and the threshold value Ath1 as described hereinabove in step S105 et seq. Thereafter, the control section 85 enters processing of a next processing cycle.

If, while the processing described above is repeated, the level detection value E(i) decreases until it is discriminated in step S101 that the level detection value E(i) is lower than the threshold value Ath1, then the processing advances from step S101 to step S110, in which the control section 85 discriminates whether or not the enable value is 1.

Then, if the enable value is 1 in step S110, then the control section 85 discriminates that the termination of the continuous sound portion is reached and advances its processing from step S110 to step S111. In step S111, the control section 85 changes the enable value to 0, sets the variable So, which indicates the number of samples after stopping of amplitude suppression, to 0 and controls the gain level of an amplitude suppression section 82, so that a gain gradually decreasing period (attenuation amount gradually increasing period) and a sound absence portion may be formed.

Figure 11:
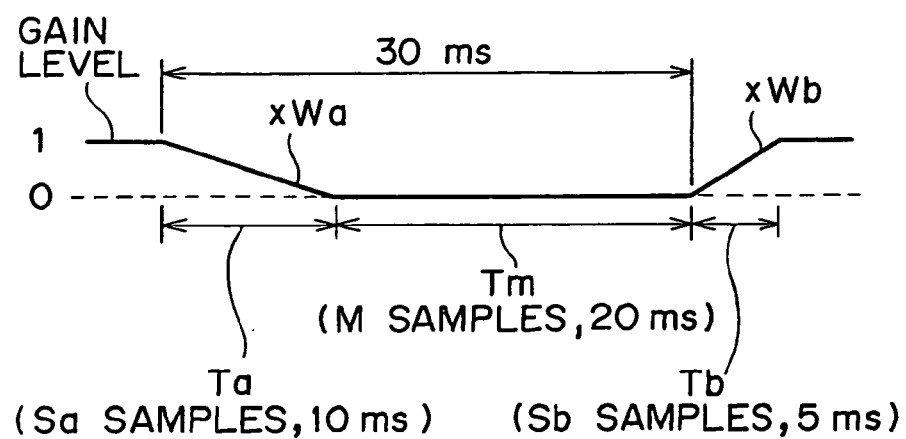
FIG. 11 is a diagrammatic view illustrating an amplitude suppression process of the amplitude suppression processing sections of FIGS. 7 and 8.

In particular, in such a period Ta of a sample number Sa as seen in FIG. 11, the weight coefficient for the sound signal of the output of the delay circuit 81 (that is, the gain level of the amplitude suppression section 82) is gradually decreased for each one sample of the sound signal as indicated by a coefficient Wa from the maximum value 1 toward the minimum value 0. Then, in such a period Tm of a sample number M as illustrated in FIG. 11 immediately following the period Ta, the weight coefficient for the sound signal of the output of the delay circuit 81 (that is, the gain level of the amplitude suppression section 82) is reduced to the minimum value 0. The gain gradually decreasing period Ta is, for example, 10 ms, and the sound absence portion Tm is, for example, 20 ms.

After the gain level of the amplitude suppression section 82 is controlled in this manner in step S111, the control section 85 enters processing of a next processing cycle. Also in the processing of the next processing cycle, since the control section 85 discriminates in step S101 that the level detection value E(i) is lower than the threshold value Ath1, the processing advances from step S101 to step S110, in which the control section 85 discriminates whether or not the enable value is 1. However, in processing in a further next processing cycle, since the enable value has been changed to 0, the processing advances from step S110 to step S112.

Then in step S112, the control section 85 discriminates whether or not the variable So, which indicates a sample number after stopping of amplitude suppression, is smaller than a sample number Sb for a period which is determined as a gain gradually increasing period (attenuation amount gradually decreasing period). If So<Sb, then the control section 85 discriminates that the start point of a next continuous sound portion is reached, and the processing advances from step S112 to step S113, in which the control section 85 controls the gain level of the amplitude suppression section 82 so that a gain gradually increasing period may be formed.

In particular, in such a period Tb of a sample number Sb immediately following the sound absence portion Tm as seen in FIG. 11, the weight coefficient for the sound signal of the output of the delay circuit 81 (that is, the gain level of the amplitude suppression section 82) is gradually increased for each one sample of the sound signal as indicated by a coefficient Wb from the minimum value 0 toward the maximum value 1. The gain gradually increasing period Tb is, for example, 5 ms.

After the gain level of the amplitude suppression section 82 is controlled in step S113 in this manner, the control section 85 enters processing of a next processing cycle. If it is discriminated in step S112 that the variable So is greater than the sample number Sb, then the control section 85 immediately enters processing of a next processing cycle.

As described above, in the amplitude suppression process of the amplitude suppression processing section 70 of FIG. 7, the amplitude of a sound signal is suppressed by the amplitude suppression section 82 under the control of the control section 85. However, since the sound signal supplied to the amplitude suppression section 82 is delayed by 30 ms from the sound signal inputted to the input terminal 71, when the termination of a continuous sound portion is detected by the control section 85, the amplitude of the sound signal can be suppressed retrospectively from the signal position prior by 30 ms to the termination of the continuous sound portion as indicated by the gain gradually decreasing period Ta and the sound absence portion Tm.

Figure 12A:
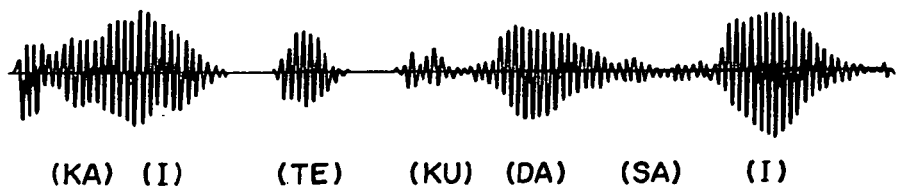
FIGS. 12A and 12B are waveform diagrams showing an example of a speech signal waveform before and after the amplitude suppression process of the amplitude suppression processing sections of FIGS. 7 and 8.
Figure 12B:
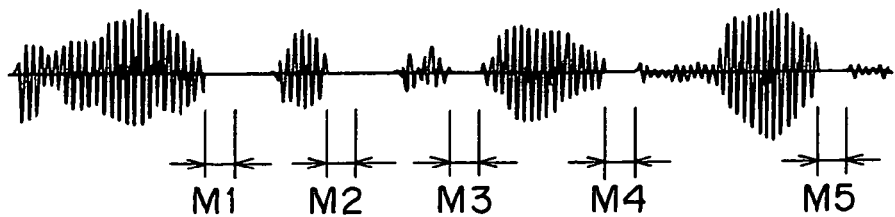

FIGS. 12A and 12B illustrate sound signal waveforms when a speaker utters "kaite kudasai" in Japanese. Specifically, FIG. 12A illustrates a waveform before the amplitude suppression process is performed, and FIG. 12B illustrates a waveform after the amplitude suppression process described above is performed. As seen from FIG. 12B, when the amplitude suppression process described above is performed, sound absence portions M1, M2, M3, M4 and M5 are formed immediately prior to the terminations of uttered sounds (continuous sound portions) "kai", "te", "ku", "da" and "sai", respectively. Consequently, the individual uttered sounds can be recognized clearly.

The silence period Tm need not necessarily be set to 20 ms but may be set suitably within the range from several ms to several tens ms. Further, a sound absence portion need not necessarily be formed, but the amplitude may alternatively be suppressed by several tens %.

Figure 8:
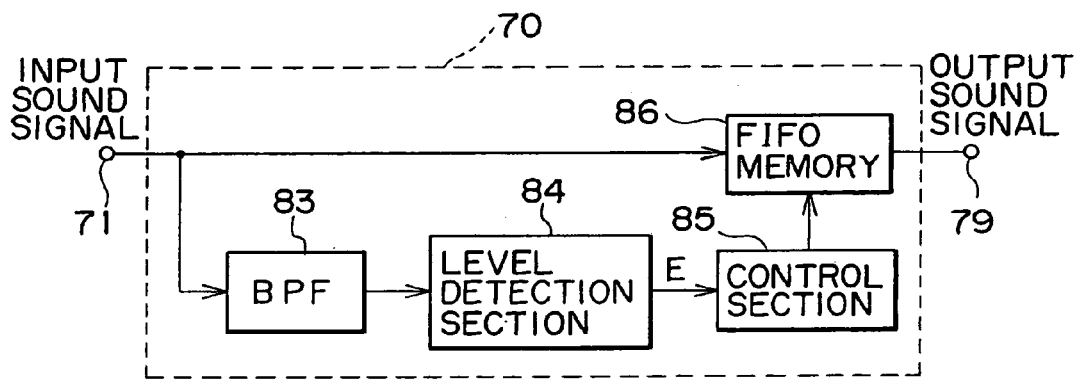
FIG. 8 is a block diagram showing a further example of the amplitude suppression processing section of the reproduction apparatus of FIG. 1.

The delay circuit 81 and the amplitude suppression section 82 of FIG. 7 may be replaced by a FIFO (first-in first-out) memory 86 as shown in FIG. 8. Referring to FIG. 8, in the amplitude suppression processing section 70 shown, when sound data written in the FIFO memory 86 is read out from the FIFO memory 86 after a delay of the fixed time, the data value is corrected by the control section 85 to obtain an output sound signal, for which the amplitude suppression process has been performed, at the output terminal 79 of the amplitude suppression processing section 70.

[Speed Conversion Process—FIGS. 13 to 17]

The sound processing section 15 shown in FIG. 2 executes speed conversion (in the case of a conversation with a person, sound speed conversion) after it suppresses the amplitude of sound data of the output of the MPEG audio decoder 14 at the termination of a continuous sound portion by the amplitude suppression processing section 70 as described hereinabove.

Sound data of the output of the MPEG audio decoder 14, and accordingly, sound data of the output of the amplitude suppression processing section 70, provide, in the case of double speed reproduction, 2×2,880 samples for 60 ms, but, in the case of triple speed reproduction, 3×2,880 samples for 60 ms. While, in the following, speed conversion processing is described taking processing in the case of double speed reproduction as an example, it similarly applies to processing in the case of triple speed reproduction.

Figure 13:
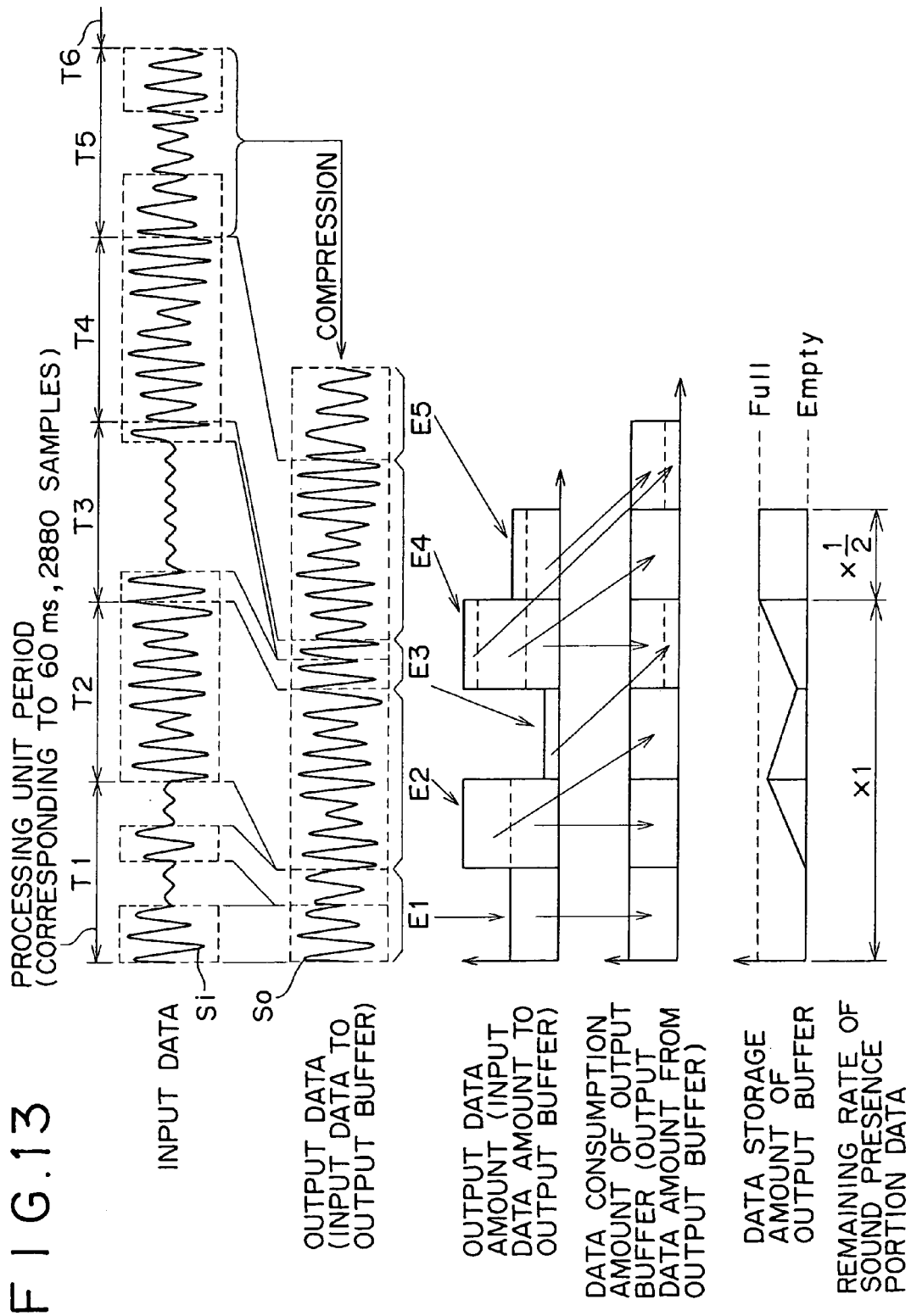
FIG. 13 is a diagrammatic view illustrating an example of a speed conversion process of a processing unit period setting section of the sound processing section of FIG. 2.

The processing unit period setting section 21 of the sound processing section 15 of FIG. 2 decides the timings of the top and the last end of each of processing unit periods of the speed conversion process at time intervals corresponding to 60 ms which is shorter than a phonemic time (for 2,880 samples; in the case of double speed reproduction, the absolute time is 30 ms) as indicated as processing unit periods T1 to T6 in FIG. 13 in response to a timing signal and a clock signal from the system controller 6. It is to be noted, however, that the processing unit period setting section 21 may be formed as part of the system controller 6 or as part of the speed conversion processing section 23.

The sound presence/absence discrimination section 22 identifies and discriminates a sound presence portion and a sound absence portion of input data Si, that is, sound data of the output of the amplitude suppression processing section 70. More particularly, as seen from FIG. 14, the sound presence/absence discrimination section 22 divides each processing unit period corresponding to 60 ms (2,880 samples) of the input data Si into 20 discrimination unit periods each corresponding to 3 ms (for 144 samples; in the case of double speed reproduction, the absolute time is 1.5 ms), calculates an average value of absolute values of the data of 144 samples of each of the discrimination unit periods and discriminates whether or not the average value exceeds a threshold value, and discriminates, if the average value exceeds the threshold value, that the discrimination unit period is a sound presence portion, but if the average value is equal to or lower than the threshold value, that the discrimination period is a sound absence portion.

The output buffer 24 functions as a ring buffer of the FIFO structure. FIGS. 15A, 15B and 15C illustrate writing of data into the output buffer 24, reading out of data from the output buffer 24, and movements of input and output pointers of the output buffer 24.

When the output buffer 24 has no data written therein, data is written in order into the output buffer 24 beginning with the top address as seen in FIG. 15A, and also the input pointer moves rearwardly in response to the writing. At this time, the output pointer indicates the top address.

FIG. 15B illustrates a state wherein, from the state illustrated in FIG. 15A, data is further written into the output buffer 24 and the data are read out successively beginning with the top address. Also the output pointer moves rearwardly.

As data is further written into the output buffer 24 until the input pointer reaches the last address, then the input pointer returns to the top address as seen in FIG. 15C. At this time, the indication position of the input pointer is controlled so that new data may be overwritten only on data which has been outputted already. Also the output pointer returns to the top address after it reaches the last address.

Referring back to FIG. 2, the D/A converter 25 converts sound data outputted from the output buffer 24 into an analog sound signal, and the sound amplifier 26 amplifies the analog sound signal. The analog sound signal from the sound amplifier 26 is supplied to the sound outputting apparatus 16 of FIG. 1.

The speed conversion processing section 23 performs speed conversion of sound data of the output of the amplitude suppression processing section 70, that is, the input data Si in accordance with a speed conversion processing routine illustrated in FIG. 16.

Referring to FIG. 16, in the speed conversion processing routine 30 illustrated, the speed conversion processing section 23 discriminates, first in step 31, from a result of discrimination of the sound presence/absence discrimination section 22, whether or not each processing unit period of the input data Si includes a sound absence portion or portions for more than a magnification-corresponding time. The magnification-corresponding time is a time interval obtained by subtracting a time obtained by multiplying the processing unit time by a reciprocal to the reproduction magnification from the processing unit time, and is a 30 ms-corresponding time (1,440 samples) where the processing unit time is a 60 ms-corresponding time (2,880 samples) and double speed reproduction is performed. In other words, in step 31, the speed conversion processing section 23 discriminates whether or not each of the processing unit periods includes a sound absence portion for 30 ms (1,440 samples) or more.

Then, if the processing unit period includes a sound absence portion of a 30 ms-corresponding time (1,440 samples) or more, then the processing advances from step 31 to step 32, in which the speed conversion processing section 23 discriminates whether or not data for more than 30 ms (1,440 samples) are accumulated in the output buffer 24. If data for more than 30 ms (1,440 samples) are accumulated in the output buffer 24, then the processing advances from step 32 to step 33, in which the speed conversion processing section 23 deletes all of the sound absence portions in the processing unit period, joins sound presence portions before and after the sound absence portions, and writes all of the data in the sound presence portions within the processing unit period into the output buffer 24.

If data for more than 30 ms (1,440 samples) are not accumulated in the output buffer 24, then the processing advances from step 32 to step 34, in which the speed conversion processing section 23 adds, to all of the sound presence portions for less than 30 ms (1,440 samples) within the processing unit period, part of the sound absence portions within the processing unit period beginning with a portion near to the top of the processing unit period and writes data for 30 ms (1,440 samples) within the processing unit period into the output buffer 24.

It is to be noted, however, that, if sound presence portions and sound absence portions are present individually for just 30 ms (1,440 samples) within the processing unit period, then the speed conversion processing section 23 deletes all of the sound absence portions within the processing unit period, joins the sound presence portions before and after the sound absence portions, and writes all only of the sound presence portions within the processing unit period into the output buffer 24.

On the other hand, when a processing unit period includes sound absence portions for less than 30 ms (1,440 samples), that is, when a processing unit period includes sound presence portions for more than 30 ms (1,440 samples), the processing advances from step 31 to step 35, in which the speed conversion processing section 23 discriminates whether or not the output buffer 24 has a free area sufficient to store all of data of the sound presence portions for more than 30 ms (1,440 samples) within the processing unit period.

Then, if the output buffer 24 has a free area sufficient to store all of data of the sound presence portions for more than 30 ms (1,440 samples) within the processing unit time, then the processing advances from step 35 to step 33, in which the speed conversion processing section 23 deletes all of the sound absence portions in the processing unit period, joins sound presence portions before and after the sound absence portions, and writes all of the data in the sound presence portions within the processing unit period into the output buffer 24.

It is to be noted, however, that, when all of the data for 60 ms (2,880 samples) within the processing unit period are a sound presence portion, the speed conversion processing section 23 writes the data of the sound presence portion for 60 ms (2,880 samples) into the output buffer 24.

On the other hand, if the output buffer 24 does not have a free area sufficient to store all of data of the sound presence portions for more than 30 ms (1,440 samples) within the processing unit period, then the processing advances from step 35 to step 36, in which the speed conversion processing section 23 compresses the data so that the sound presence portions may become data for 30 ms (1,440 samples), and writes the thus compressed data into the output buffer 24. In this instance, the data are reproduced at a high rate as hereinafter described.

The compression processing is described. For example, when data for 60 ms (2,880 samples) within the processing unit period all make a sound presence portion as seen in an upper stage of FIG. 17, data for 1,040 samples at an intermediate portion of the processing unit period are deleted as seen in a lower stage of FIG. 17, and data of 400 samples at a rear portion in the front part data Sf of 920 samples from the top of the period and data of 400 samples at a forward portion in the rear part data Sb of 920 samples from the last end of the period are determined as a fade period, and the front part data Sf and the rear part data Sb are joined together by cross fading. The reason why the data Sf and Sb are joined together by cross fading in this manner is that it is intended to prevent noise from appearing with data after compression at the joined potion.

If a sound absence portion is present within a processing unit period, then data for 1,040 samples including the sound absence portion are deleted and sound presence portions individually of 920 samples are joined together by similar cross fading. If the sound absence portion is less than 1,440 samples but exceeds 1,040 samples, part of the sound absence portion is included into part of a sound presence portion so that a fade period of 400 samples is obtained and data of 1,440 samples may be obtained as data after joined.

Referring to FIG. 13, in a processing unit period T1, sound presence portions surrounded by broken lines and sound absence portions which are not surrounded by broken lines are present individually just for 30 ms (1,440 samples) in the input data Si, and no data is stored in the output buffer 24 because the processing unit period T1 is a time immediately after reproduction is started.

Accordingly, within the processing unit period T1, the sound absence portions for just 30 ms (1,440 samples) are all deleted and the sound presence portions before and after the sound absence portions are joined together as indicated by a portion E1 in the output data So of FIG. 13 so that all only of the data of the sound presence portions for just 30 ms (1,440 samples) are written into the output buffer 24 by the processing in steps 31, 32 and 34.

It is to be noted, however, that FIG. 13 does not indicate a relationship of timings of the input data Si and the output data So, and the output data So are delayed in timing from the input data Si and displaced from the indicated position of FIG. 13.

The data of the sound presence portions for 30 ms (1,440 samples) within the processing unit period T1 written in the output buffer 24 are read out from the output buffer 24 over a time of 30 ms and converted into an analog sound signal by the D/A converter 25.

In another processing unit period T2 of FIG. 13, all of data for 60 ms (2,880 samples) make a sound presence portion, and the output buffer 24 has a free area sufficient to store all of the data of the sound presence portion for 60 ms (2,880 samples).

Accordingly, within the processing unit period T2, the data of the sound presence portion for 60 ms (2,880 samples) are written as they are into the output buffer 24 as indicated by a portion E2 in the output data So of FIG. 13 by the processing in steps 31, 35 and 33.

The data for 30 ms (1,440 samples) of the front half in the data of the sound presence portion for 60 ms (2,880 samples) within the processing unit period T2 written in the output buffer 24 are read out from the output buffer 24 over a time of 30 ms next to the time of 30 ms within which the data of the sound presence portions in the period T1 are read out and converted into an analog sound signal by the D/A converter 25.

In a further processing unit period T3 of FIG. 13, sound presence portions of input data Si surrounded by broken lines are present only for less than 30 ms (1,440 samples) while a sound absence portion which is not surrounded by broken lines is present for more than 30 ms (1,440 samples), and data for more than 30 ms (1,440 samples) are stored in the output buffer 24.

Accordingly, within the processing unit period T3, the sound absence portion for more than 30 ms (1,440 samples) is all deleted and the sound presence portions before and after the sound absence portion are joined together as indicated by a portion E3 in the output data So of FIG. 13 so that all only of the data of the sound presence portions for less than 30 ms (1,440 samples) are written into the output buffer 24 by the processing in steps 31, 32 and 33.

Then, those data for 30 ms (1,440 samples) of the rear half from within the data of the sound presence portions for 60 ms (2,880 samples) of the processing unit period T2 which are stored in the output buffer 24 are read out from the output buffer 24 over a time of 30 ms next to the time of 30 ms within which the data of the front half are read out and converted into an analog sound signal by the D/A converter 25.

In a still further processing unit period T4 of FIG. 13, all of data for 60 ms (2,880 samples) make a sound presence portion, and the output buffer 24 has a free area sufficient to store all of the data of the sound presence portion for 60 ms (2,880 samples).

Accordingly, within the processing unit period T4, the data of the sound presence portion for 60 ms (2,880 samples) are written as they are into the output buffer 24 as indicated by a portion E4 in the output data So of FIG. 13 by the processing in steps 31, 35 and 33.

Then, data for 30 ms (2,880 samples) including the data of the sound presence portions for 30 ms (1,440 samples) of the processing unit period T3 stored in the output buffer 24 and data of part of the front half from among the data of the sound presence portion for 60 ms (2,880 samples) of the processing unit period T4 written in the output buffer 24 are read out from the output buffer 24 over a time of 30 ms and converted into an analog sound signal by the D/A converter 25.

In a yet further processing unit period T5 of FIG. 13, all of data for 60 ms (2,880 samples) make a sound presence portion, and the output buffer 24 does not have a free area sufficient to store all of the data of the sound presence portion for 60 ms (2,880 samples).

Accordingly, within the processing unit period T5, the data of the sound presence portion for 60 ms (2,880 samples) are compressed to data for 30 ms (1,440 samples) and written into the output buffer 24 as indicated by a portion E5 in the output data So of FIG. 13 and as seen from FIG. 17 by the processing in steps 31, 35 and 36.

Then, data for 30 ms (1,440 samples) including the data of the remaining portion of the front half from among the data of the sound presence portions for 60 ms (2,880 samples) of the processing unit period T4 and data of part of the rear half are read out from the output buffer 24 over a time of 30 ms and converted into an analog sound signal by the D/A converter 25.

Further, data for 30 ms (1,440 samples) including the data of the remaining portion of the rear half from among the data of the sound presence portions for 60 ms (2,880 samples) of the processing unit period T4 and data of part of the compressed data for 30 ms (1,440 samples) of the sound presence portion of the processing unit period T5 are read out from the output buffer 24 over a time of 30 ms and converted into an analog sound signal by the D/A converter 25.

In summary, in the compression process illustrated in FIG. 13, within the processing unit periods T1 to T4, only sound absence portions in the input data Si are all deleted while data only of sound presence portions are all written into the output buffer 24 and the data only of the sound presence portions are read out at the rate of 2,880 samples for 60 ms from the output buffer 24. Consequently, the output magnification is 1, and only the sound presence portions are all outputted at a normal speed.

Within the processing unit period T5, the data of the sound presence portions for 60 ms (2,880 samples) are compressed to data for 30 ms (1,440 samples) and written into the output buffer 24, and then read out over a time of 30 ms from the output buffer 24. Consequently, the sound presence portions are reduced exceptionally and reproduced fast.

It is to be noted that, when a sound absence portion is added to all of sound presence portions to produce data for 30 ms (1,440 samples) to be written into the output buffer 24 in step 34 of FIG. 16, though not shown in FIG. 13, for example, if, within the processing unit period T2, different from that of FIG. 13, sound presence portions are present only for less than 30 ms (1,440 samples) while sound absence portions are present for more than 30 ms (1,440 samples), then since data for more than 30 ms (1,440 samples) are not stored in the output buffer 24 within the processing unit period T2 of FIG. 13, part of a sound absence portion for more than 30 ms (1,440 samples) is added to each of the sound presence portions for less than 30 ms (1,440 samples) beginning with a portion near to the top of the processing unit period T2 to produce data for 30 ms (1,440 samples), and the produced data for 30 ms (1,440 samples) within the processing unit period T2 are written into the output buffer 24.

As described above, with the compression process described above, since the output buffer 24 is used effectively, interruption of sound by deletion of a sound presence portion is reduced and it becomes easy to recognize contents of a sound signal only by using a necessary minimum memory.

[Sound Quality Improvement upon the Speed Conversion Process—FIGS. 18 to 21]

Figure 19:
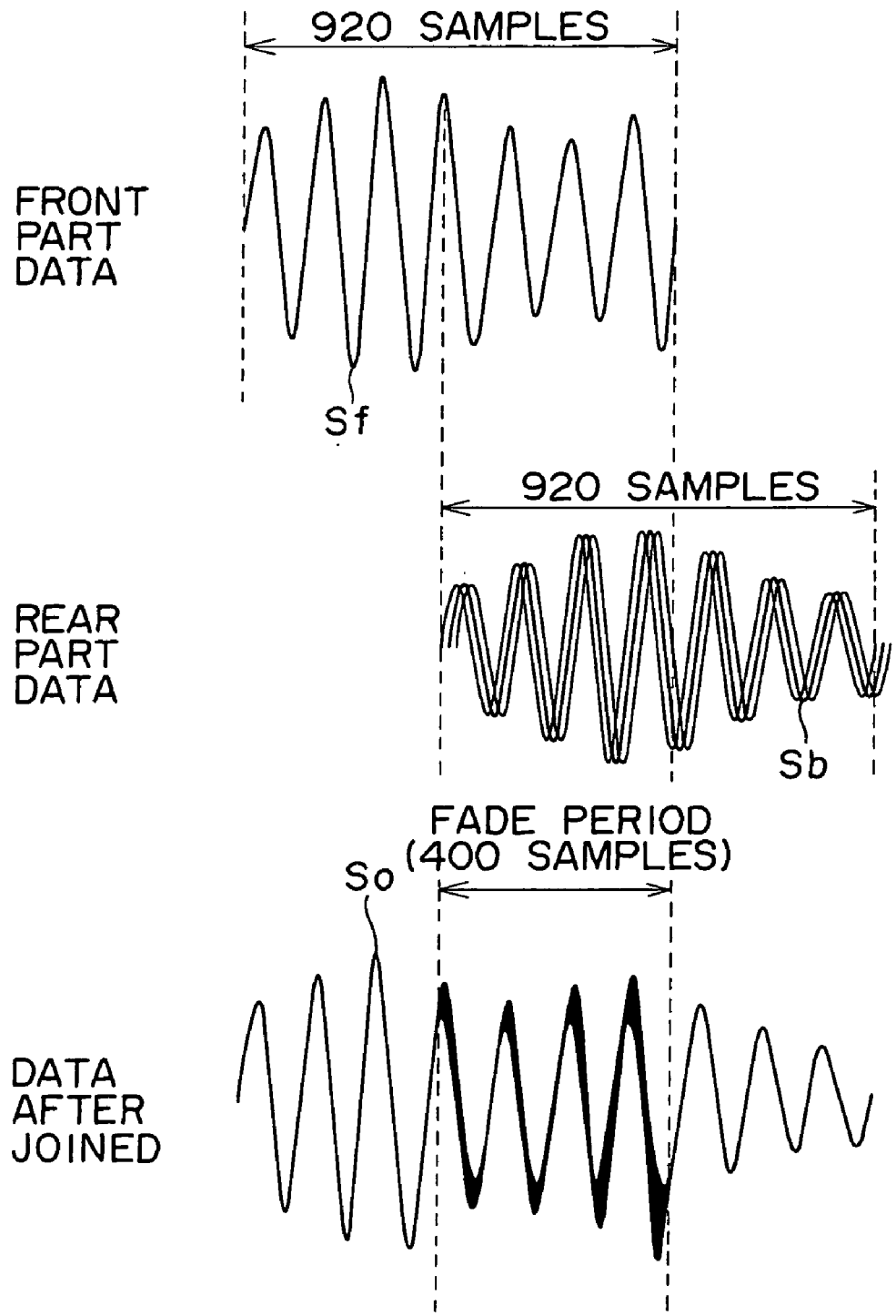
FIG. 19 is a waveform diagram illustrating an adjustment method when position adjustment is performed upon data compression.

(Position Adjustment upon Data Compression—FIGS. 18 and 19)

When front part data Sf and rear part data Sb are joined together in step 36 of FIG. 16 by cross fading as illustrated at the portion E5 of FIG. 13 and in the lower stage of FIG. 17, if the phases of the front part data Sf and the rear part data Sb coincide with each other in the fade period as seen in FIG. 18A at the joined portion, then the data after joined do not provide humming.

However, if the phases of the front part data Sf and the rear part data Sb are displaced a great amount from each other in the fade period as seen in FIG. 18B, then the data after joined provide humming at the joined portion, which deteriorates the sound quality.

Therefore, upon joining of the front part data Sf and the rear part data Sb by cross fading, the positional relationship between the front part data Sf and the rear part data Sb is adjusted in the following manner.

In particular, the rear part data Sb are moved in timing by a time of one sample or a few samples within a time of a predetermined number of samples with respect to the front part data Sf, and an integrated value (sum) of absolute values of finite differences between data values of the front part data Sf and data values of the rear part data Sb within the fade period for 400 samples described above at the individually moved positions as represented by the area of a painted up portion of the waveform shown as the data after joined in FIG. 19 is calculated.

Then, the moved position at which the integrated value exhibits a minimum value is detected as a position at which the front part data Sf and the rear part data Sb have an optimum phase relationship, and the front part data Sf and the rear part data Sb are joined together at the moved position by cross fading as described above.

Where data of the front part data Sf and the rear part data Sb in the fade period are represented by F[n] and B[n], respectively, and the sample number in the fade period is represented by j, data X[n] in the joined portion (fade period) of the data after joined are represented by $$X[n]=((j-n)*F[n]+n*B[n])/j \qquad (1)$$

where n=0, 1, 2, . . . , (j−1).

By the joining method described above, data after joined provides little humming or disagreeable feeling at any such joined potion.

Figure 20:
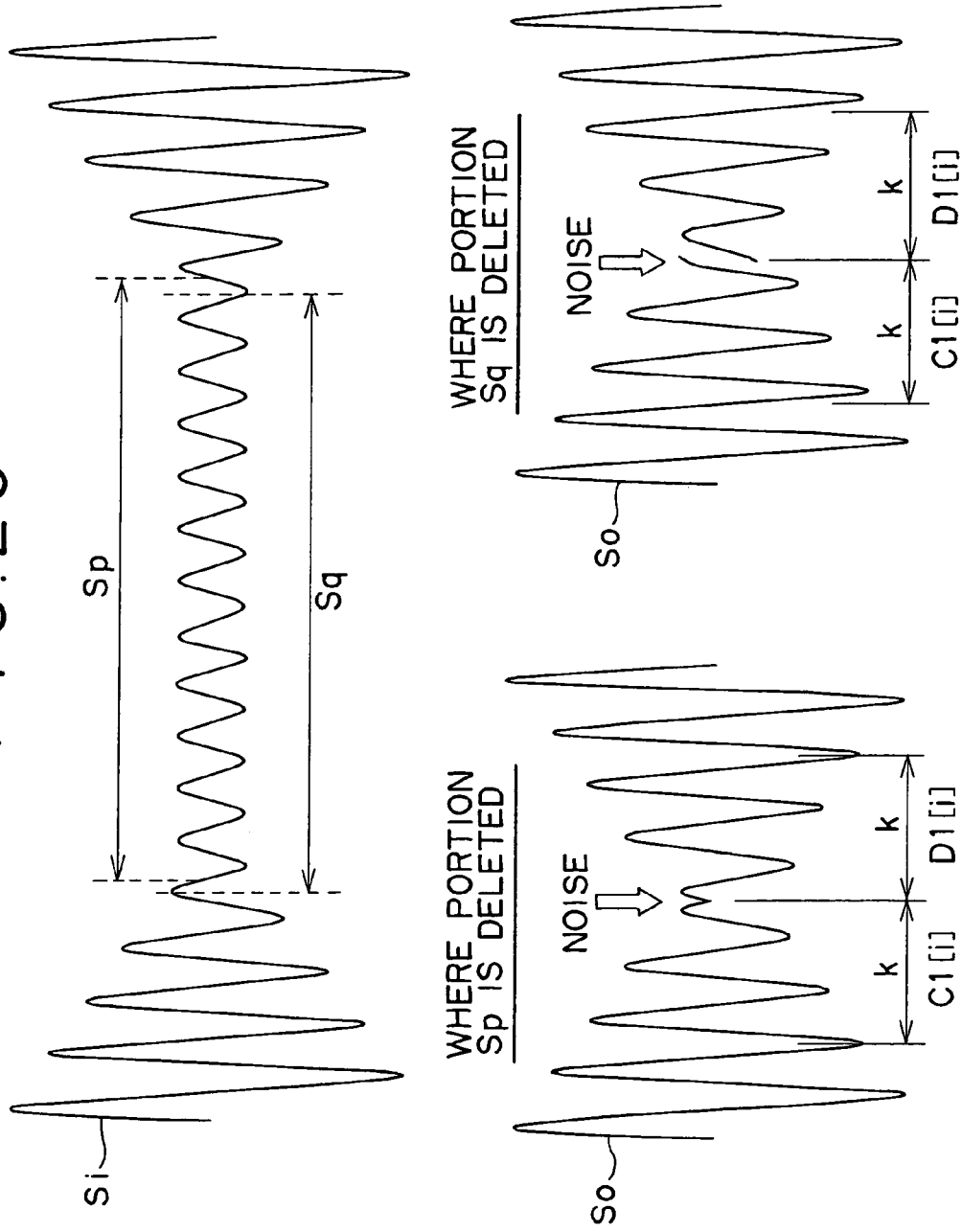
FIG. 20 is a waveform diagram illustrating generation of noise upon deletion of a sound absence portion.
Figure 21:
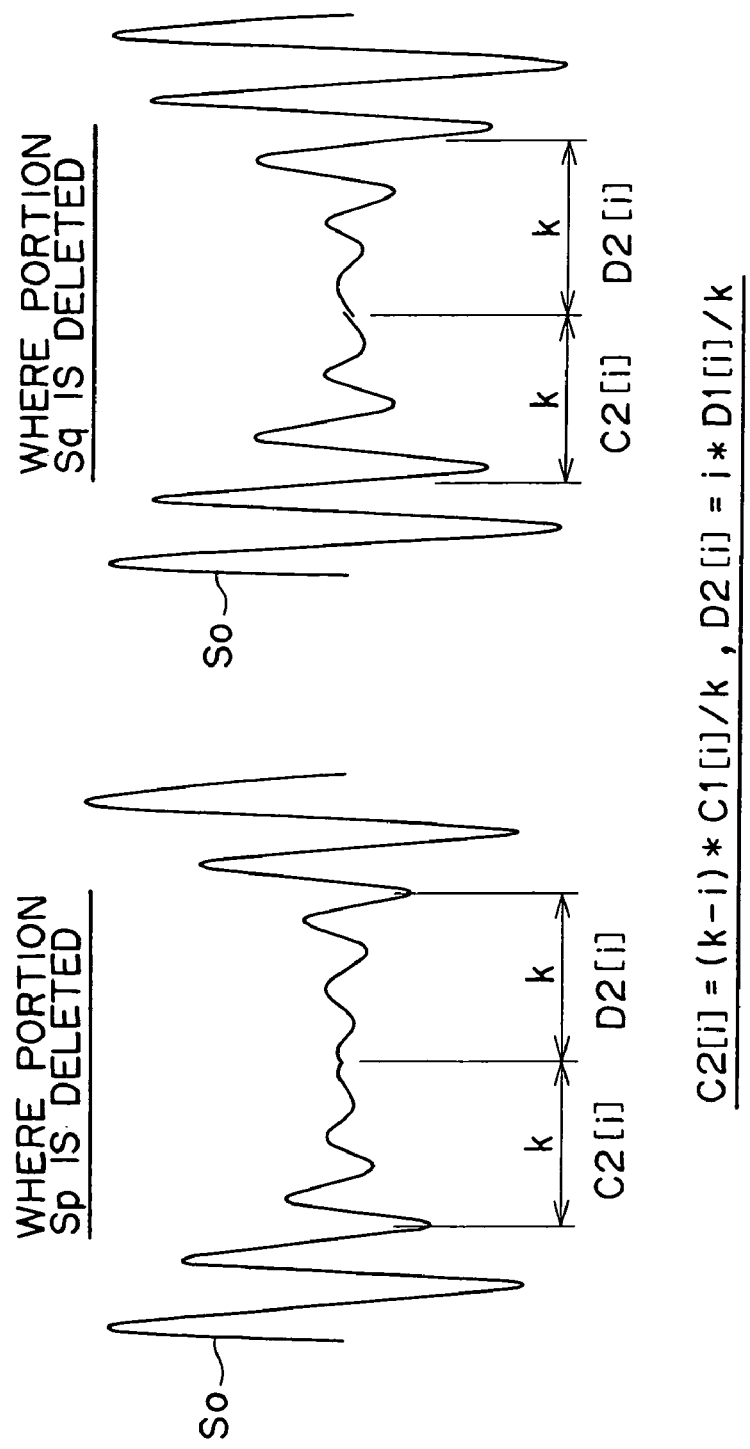
FIG. 21 is a waveform diagram illustrating a noise generation prevention method upon deletion of a sound absence portion.

(Prevention of Noise Production upon Deletion of a Sound Absence Portion—FIGS. 20, 21)

When a sound absence portion in the input data Si is deleted to join preceding and following sound presence portions as indicated by the portion E1 of FIG. 13 in step 34 of FIG. 16 or as indicated by the portion E3 of FIG. 13 in step 33 of FIG. 16, if a data portion Sp shown in the upper stage of FIG. 20 is deleted as the sound absence portion, then although the portion Sp is a sound absence portion and has a low level, since the output data So after joined exhibit a great variation across the joining point as seen on the left side in a lower stage of FIG. 20, unique noise is produced at the joining point. On the other hand, when a data portion Sq shown in the upper stage of FIG. 20 is deleted as the sound absence portion, similar unique noise is produced at the joining point of the output data So after joined.

Therefore, upon joining of sound presence portions before and after a deleted sound absence portion, a fade-out process and a fade-in process are preformed for the sound presence portions over a predetermined number k of samples before and after the joining point.

More particularly, where data of the front half of the joining portion before the fade-out processing are represented by C1[i] and data of the rear half of the joining portion before the fade-in process are represented by D1[i] as seen on the left side and the right side in the lower stage of FIG. 20, and data of the front half of the joining portion after the face-out process are represented by C2[i] and data of the rear half of the joining portion after the fade-in process are represented by D2[i] as seen on the left side and the right side of FIG. 21, the data C2[i] and D2[i] are given, respectively, by $$C2[i]=(k-1)*C1[i]/k \qquad (2)$$
$$D2[i]=i*D1[i]/k \qquad (3)$$

where i=0, 1, 2, . . . , (k−1).

Where preceding and following sound presence portions are joined by performing a fade-out process and a fade-in process in this manner, the output data So after joined does not provide unique noise as seen from FIG. 21.

[Case Wherein the Processing Unit Time of the Speed Conversion Process is Varied—FIGS. 22 to 26]

Figure 22:
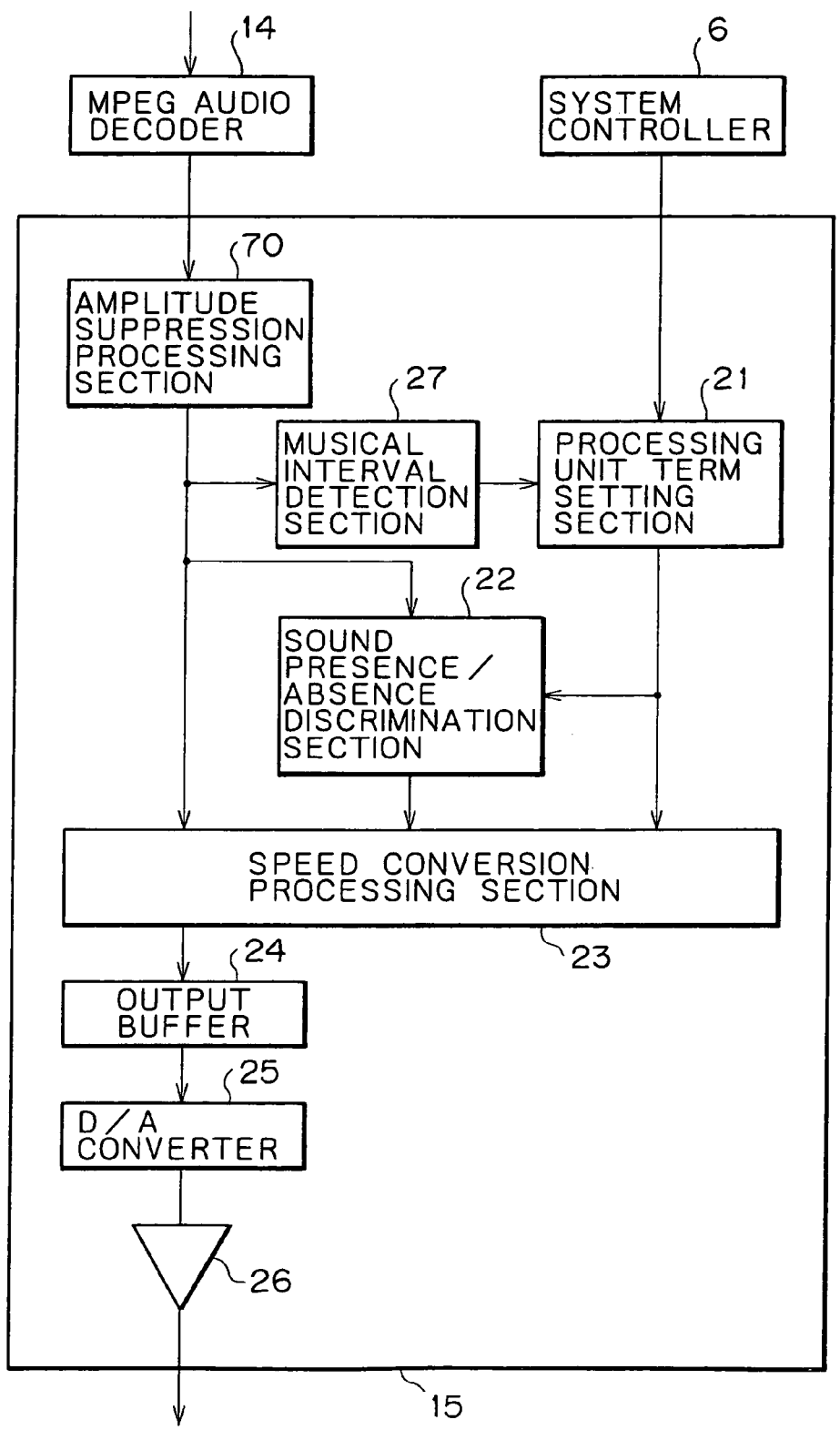
FIG. 22 is a block diagram showing another form of the speech processing section of the reproduction apparatus of FIG. 1.
Figure 23:
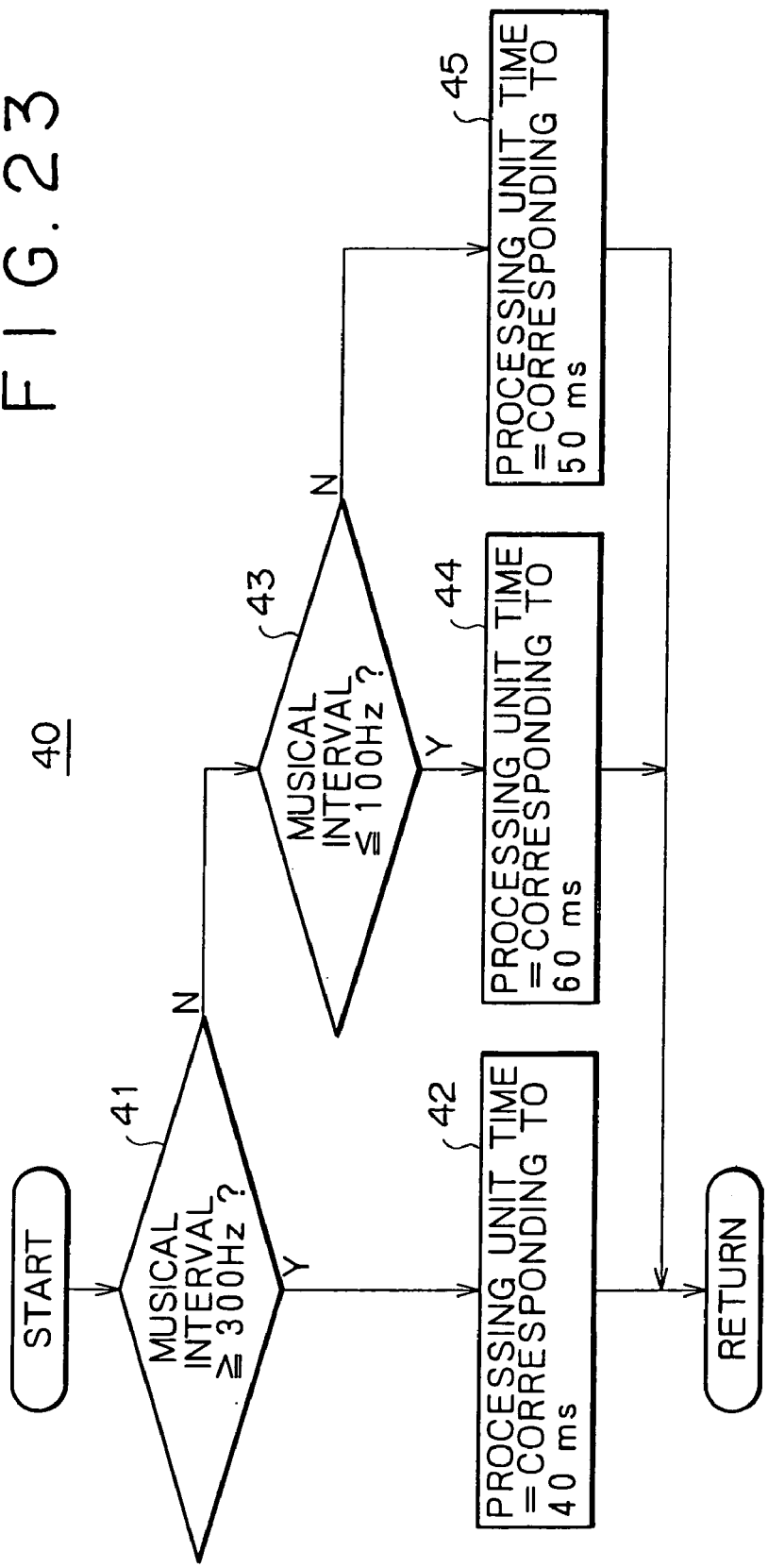
FIG. 23 is a flow chart illustrating an example of a musical interval correspondence process unit length setting processing routine which is executed by a processing unit period setting section of the speech processing section of FIG. 22.

(Case Wherein the Processing Unit Time is Varied in Response to the Musical Interval—FIGS. 22 and 23)

FIG. 22 shows another form of the sound processing section 15 of FIG. 1 wherein the processing unit time of the speed conversion process is varied in response to a musical interval of a main component of a sound signal. Although it is possible to vary the processing unit time linearly with respect to the musical interval, in the sound processing section 15 described below, the musical interval is divided into three stages to vary the processing unit time among three stages.

Referring to FIG. 22, the sound processing section 15 is a modification to and is different from the sound processing section 15 described hereinabove with reference to FIG. 2 in that it additionally includes a musical interval detection section 27. The musical interval detection section 27 detects a musical interval or tone of a main component of a sound signal of the output of the amplitude suppression processing section 70, that is, a musical interval of a frequency component at which a maximum sound level is exhibited. For the method of detecting a musical interval by the musical interval detection section 27, a known method such as FFT (fast Fourier transform) can be used.

In the sound processing section 15, the processing unit period setting section 21 determines a processing unit time based on a result of detection of the musical detection section 27 in accordance with a musical interval conformable processing unit period setting processing routine illustrated in FIG. 23 and decides timings at the top and the last of a processing unit time.

In particular, referring to FIG. 23, in the musical interval conformable processing unit period setting processing routine 40 illustrated, the processing unit period setting section 21 discriminates first in step 41 whether or not the musical interval of a result of detection of the musical interval detection section 27 is equal to or higher than 300 Hz. If the musical interval is equal to or higher than 300 Hz, then the processing advances from step 41 to step 42, in which the processing unit period setting section 21 decides the processing unit time to a time corresponding to 40 ms (1,920 samples; in double speed reproduction, the absolute time is 20 ms) which is the shortest and decides a time later by a time corresponding to 40 ms from the top of the processing unit time (the last end of the immediately preceding processing unit time) as the last end of the processing unit time (top of the immediately following processing unit period).

On the other hand, if the musical interval of a result of the detection is lower than 300 Hz in step 41, then the processing advances from step 41 to step 43, in which the processing unit period setting section 21 discriminates whether or not the musical interval of the result of the detection is equal to or lower than 100 Hz. If the musical interval is equal to or lower than 100 Hz, then the processing advances from step 43 to step 44, in which the processing unit period setting section 21 sets a processing unit time to a time corresponding to 60 ms (2,880 samples; in the case of double speed reproduction, the absolute time is 30 ms) which is the longest and decides a time corresponding to 60 ms from the top of the processing unit time as the last end of the processing unit period.

When the musical interval of the result of the detection is not equal to or lower than 100 Hz, either, that is, when the musical interval exceeds 100 Hz but is lower than 300 Hz, the processing advances from step 43 to step 45, in which the processing unit period setting section 21 sets a processing unit time to a time corresponding to 50 ms (2,400 samples; in the case of double speed reproduction, the absolute time is 25 ms) of an intermediate time length and decides a time corresponding to 50 ms from the top of the processing unit period as the last end of the processing unit period.

The speed conversion process performed by the speed conversion processing section 23 of FIG. 22 is similar to that described hereinabove except that the processing unit periods T1, T2, T3, . . . of FIG. 13 are not such fixed times as a time corresponding to 60 ms but vary like a time corresponding to 40 ms, another time corresponding to 50 ms or a further time corresponding to 60 ms, and the time corresponding to the magnification in the speed conversion processing routine 30 of FIG. 16 varies in response to a variation of the processing unit time, in the case of double speed reproduction, to a time corresponding to 20 ms (960 samples), another time corresponding to 25 ms (1,200 samples) or a further time corresponding to 30 ms (1,440 samples).

With the modified sound processing section 15 of FIG. 22, when the musical interval of a main component of a sound signal is high, the processing unit time of the speed conversion process is short whereas, when the musical interval of the main component is low, the processing unit time of the speed conversion process is long. Consequently, an output sound signal which includes a comparatively small amount of distortion or fluctuation depending upon a frequency of the sound signal can be obtained.

Figure 24:
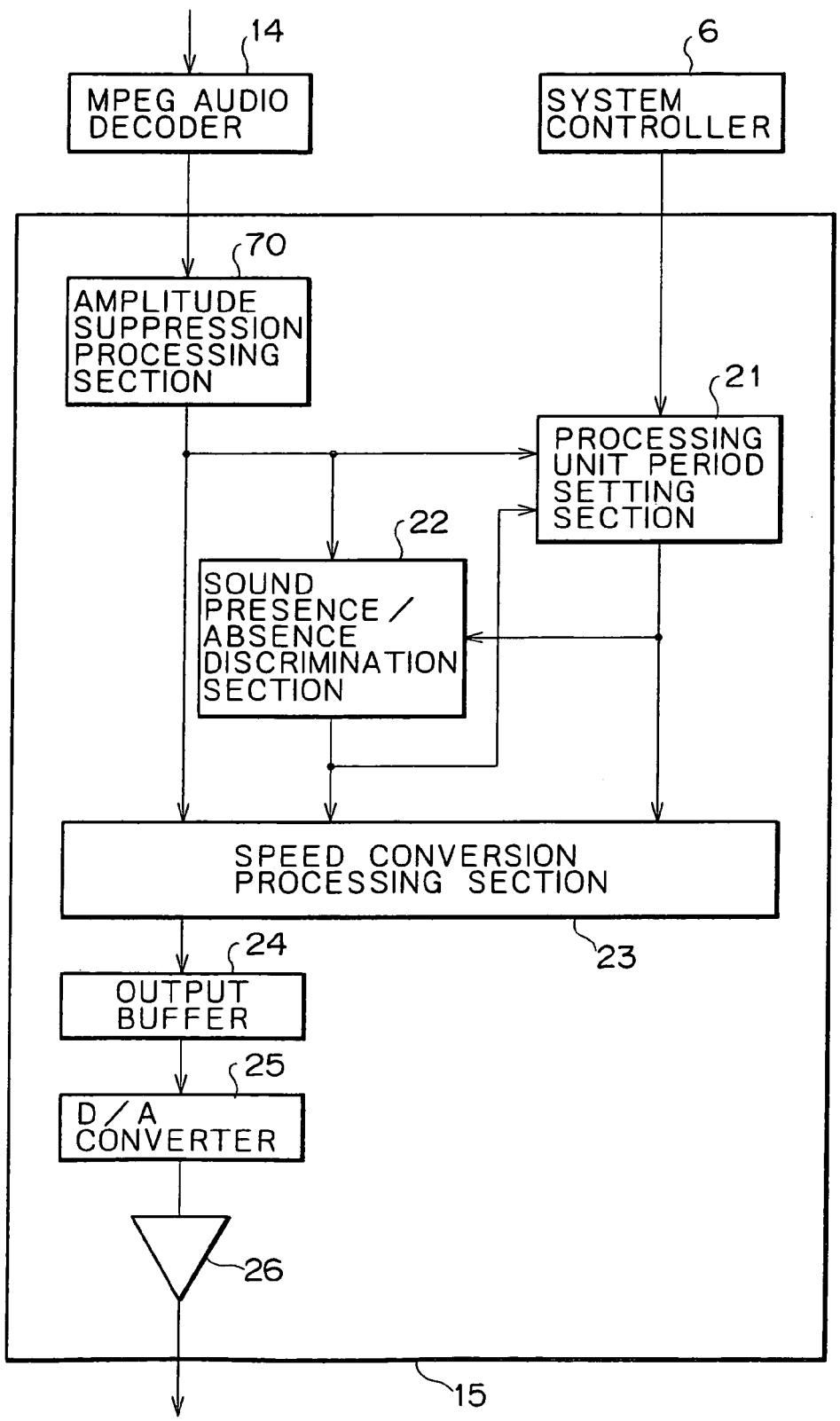
FIG. 24 is a block diagram showing a further form of the speech processing section of the reproduction apparatus of FIG. 1.

(Where a Point of a Low Level is Decided as a Breakpoint of a Processing Unit Time . . . FIGS. 24 to 26)

FIG. 24 shows a further form of the sound processing section 15 of FIG. 1 wherein a boundary between a sound absence portion and a sound presence portion in a sound presence portion at which the level is comparatively low is decided as a breakpoint of a processing unit period of the speed conversion.

Referring to FIG. 24, the sound processing section 15 shown is a modification to but is different from the sound processing section 15 described hereinabove with reference to FIG. 2 in that the processing unit period setting section 21 fetches a sound signal of the output of the amplitude suppression processing section 70 and a result of discrimination of the sound presence/absence discrimination section 22 and decides timings of the top and the last end of a processing unit time in accordance with a sound level conformable processing unit period setting processing routine illustrated in FIG. 25.

In particular, referring to FIG. 25, in the sound level conformable processing unit period setting processing routine 50 illustrated, the processing unit period setting section 21 discriminates, first in step 51, from a result of the discrimination of the sound presence/absence discrimination section 22, whether or not a point of time at which changeover between a sound absence portion and a sound presence portion occurs, that is, a point of time at which changeover from a sound absence portion to a sound presence portion occurs or a point of time at which changeover from a sound presence portion to a sound absence portion occurs, is present within the range from a time equal to or longer than a time corresponding to 30 ms to another time equal to or shorter than a time corresponding to 100 ms from the top of the processing unit time.

Then, if a changeover time point between a sound absence portion and a sound presence portion is present within the time range, then the processing advances from step 51 to step 52, in which the processing unit period setting section 21 decides the changeover time point between a sound absence portion and a sound presence portion as the last end of the processing unit time. If two or more changeover times points between a sound absence portion and a sound presence portion are present within the time range, then the first time point is decided as the last point of the processing unit period.

On the other hand, if a changeover time point between a sound absence portion and a sound presence portion is not present within the time range in step 51, then the processing advances from step 51 to step 53, in which the processing unit period setting section 21 decides a point of time, at which the sound average level is lowest within the time range, as the last end of the processing unit time. The sound average level is an average value of absolute values of data values of samples in such a discrimination unit period as shown in FIG. 14, and the top or the last end of the discrimination unit period which has a minimum average value is decided as the last end of the processing unit time.

Accordingly, in the sound processing section 15 of FIG. 24, the processing unit time is a time corresponding to 30 ms at shortest and corresponding to 100 ms at longest.

The case indicated as "In case of fixed length" in FIG. 26 is a case wherein the sound processing section 15 has such a construction as shown in FIG. 2 and the processing unit periods T1, T2, T3, . . . have a fixed time corresponding to 60 ms. The case indicated as "In case of variable length" in FIG. 26 is a case wherein the sound processing section 15 has such a construction as shown in FIG. 24 and the timings of the top and the last end of each of processing unit periods T11, T12, T13, . . . are determined and the time between them is variable. It is to be noted, however, that times indicated in FIG. 26 are not absolute times but times where 2,880 samples are a time corresponding to 60 ms as described hereinabove.

In particular, in the example illustrated in FIG. 26, since a time point ta at which the input data Si change over from a sound presence portion to a sound absence portion is present within a range from a time equal to or longer than a time corresponding to 30 ms to another time equal to or shorter than a time corresponding to 100 ms from the point of time of the top of the first processing unit time T11 which is indicated as 0 ms on the time axis, the time point ta is decided as the last end of the processing unit time T11, that is, the top of the next processing unit time T12.

Further, since a time point tb at which the input data Si change over from a sound absence portion to a sound presence portion is present within a range of time from a time equal to or longer than a time corresponding to 30 ms to another time equal to or shorter than a time corresponding to 100 ms from the time point ta of the top of the processing unit period T12, the time point tb is decided as the last end of the processing unit period T12, that is, the top of the next processing unit period T13.

Furthermore, since a changeover time point between a sound absence portion and a sound presence portion is not present within a range of time from a time equal to or longer than a time corresponding to 30 ms to another time equal to or shorter than a time corresponding to 100 ms from the time point tb of the top of the processing unit period T13, the time point tc, where the sound average level of the input data Si has a minimum average value within the range of time, is decided as the last end of the processing unit period T13, that is, the top of the next processing unit period T14.

According to the sound processing section 15 of FIG. 24, since a boundary between a sound absence portion and a sound presence portion or a portion in a sound presence portion at which the level is relatively low is set as a breakpoint of a processing unit time of a speed conversion process, deterioration of the sound quality caused by patching of a sound signal can be reduced significantly.

Figure 27:
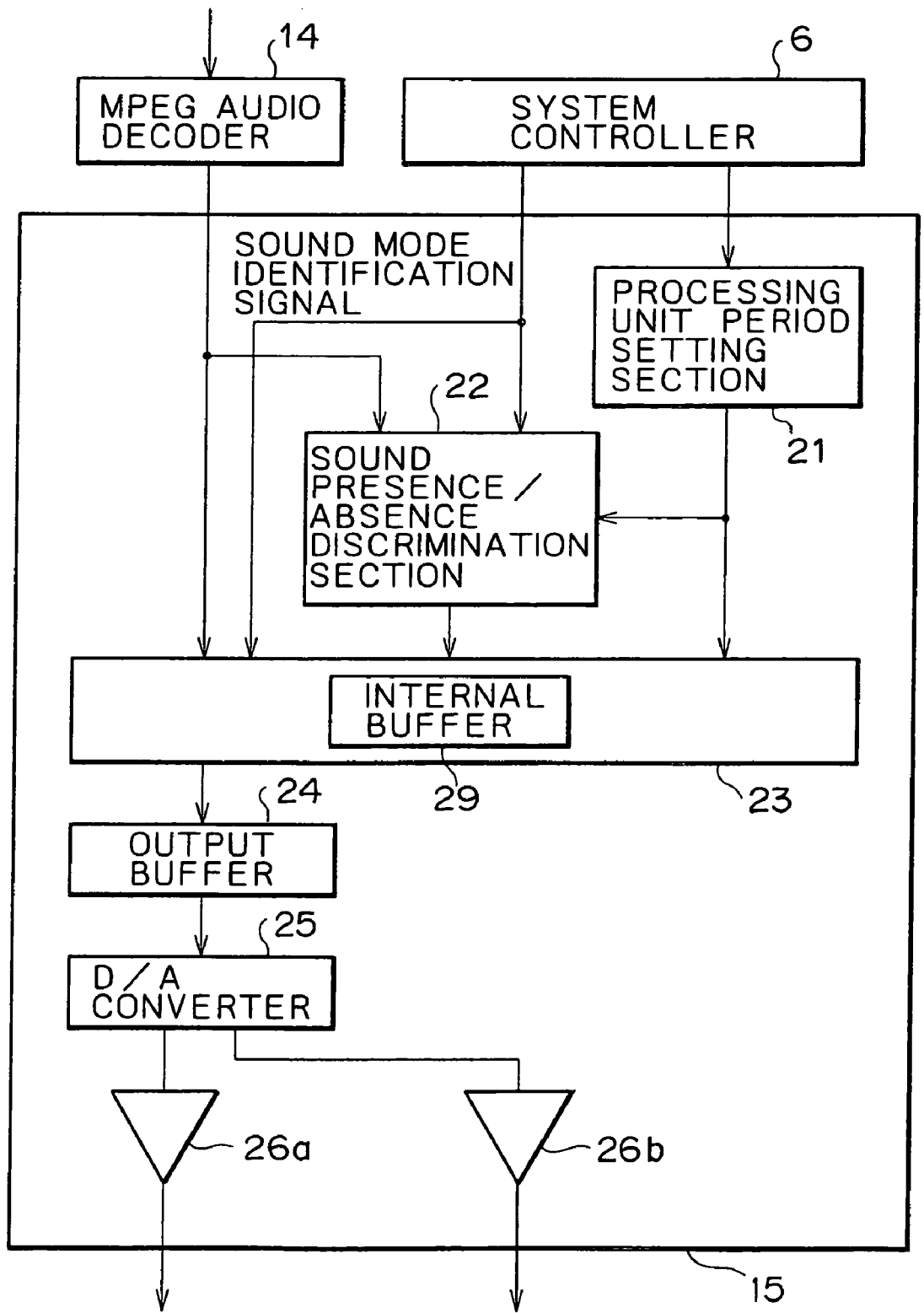
FIG. 27 is a block diagram showing a still further form of the speech processing section of the reproduction apparatus of FIG. 1.
Figure 28:
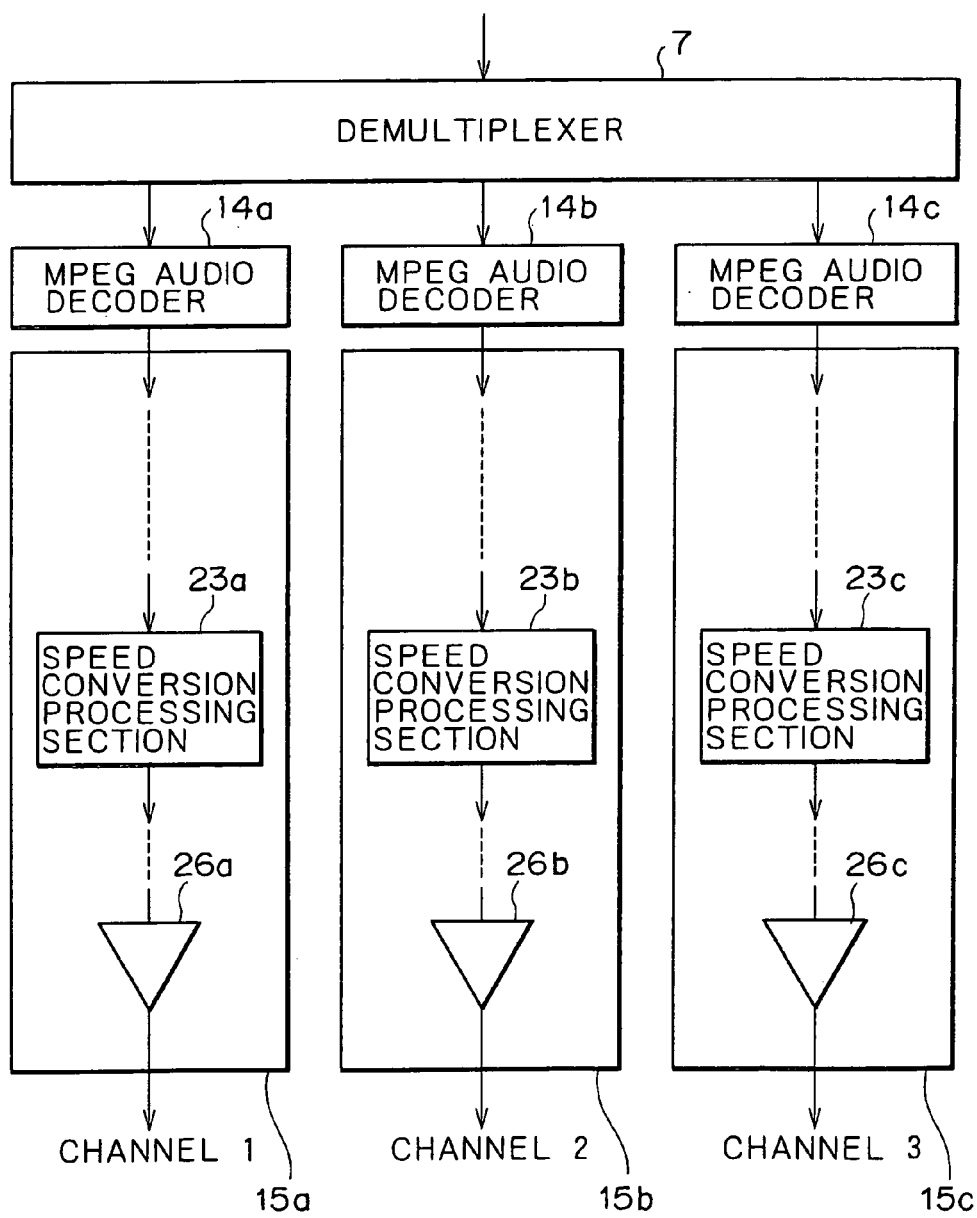
FIG. 28 is a block diagram showing an example of a reproduction apparatus for multi-channel reproduction.

[Multi-Channel Reproduction . . . FIGS. 27 and 28]

The sound processing section 15 described above with reference to FIG. 2, 22 or 24 is described as a sound processing section wherein a sound signal of 1 channel is reproduced from the recording medium 1 of FIG. 1. However, it is possible to record sound signals of multi-channels onto the recording medium 1, and it is possible to selectively reproduce a sound signal of a channel desired by a user from among the sound signals of the multi-channels or reproduce the sound signals of the multi-channels simultaneously. Several examples of the sound processing section just mentioned are described below.

(First Example . . . FIG. 27)

FIG. 27 shows an example of the sound processing section 15 wherein one or both of sound signals in a stereo sound signal or binary sounds (main voice and sub voice) such as bilingual sounds are selectively reproduced.

Referring to FIG. 27, in the sound processing section 15 shown, a sound mode identification signal indicative of a sound signal selected by a user is obtained from the system controller 6 and supplied to the sound presence/absence discrimination section 22 and the speed conversion processing section 23. Consequently, sound presence/absence discrimination by the sound presence/absence discrimination section 22 and a speed conversion process by the speed conversion processing section 23 are controlled to be changed over in the following manner in response to the sound mode selected by the user.

In particular, when a stereo sound signal is to be reproduced, sound data of the left and right channels are obtained alternately from the MPEG audio decoder 14, and the sound presence/absence discrimination section 22 calculates, for each of such discrimination unit periods as shown in FIG. 14, an average value of data of the left channel and data of the right channel, discriminates whether or not the average value exceeds a threshold value, and discriminates, when the average value exceeds the threshold value, that the discrimination unit period is a sound presence portion, but discriminates, when the average value is equal to or lower than the threshold value, that the discrimination unit time is a sound absence portion.

The speed conversion processing section 23 separates the sound data of the left and right channels from the MPEG audio decoder 14 once into data of the left channel and data of the right channel for each of the processing unit periods set by the processing unit period setting section 21 and writes the data of the left channel and the data of the right channel into areas of an internal buffer 29 set separately as an area for the left channel and another area for the right channel.

Further, the speed conversion processing section 23 performs a speed conversion process independently for the sound data of the left and right channels written in the separate areas of the internal buffer 29 in accordance with the speed conversion processing routine 30 illustrated in FIG. 16 based on a result of discrimination of the sound presence/absence discrimination section 22 described above, and writes the thus processed sound data of the left and right channels into the output buffer 24 such that the data of the left channel and the data of the right channel may be disposed alternately.

The sound data of the left and right channels after the speed conversion processing are read out alternately from the output buffer 24 and converted into analog signals by the D/A converter 25. Then, the analog sound signals of the left and right channels from the D/A converter 25 are outputted separately to sound amplifiers 26a and 26b, respectively.

On the other hand, when one of sound signals for main voice and sub voice is to be reproduced, the sound presence/absence discrimination section 22 calculates an average value of absolute values of the sound data of the selected voice, that is, of the main voice when the main voice is selected, but of the sub voice when the sub voice is selected, for each of such discrimination unit periods as illustrated in FIG. 14, and discriminates whether or not the average exceeds the threshold value to discriminate whether or not the discrimination unit period is a sound presence portion or a sound absence portion.

The speed conversion processing section 23 performs speed selection processing of the sound data of the output of the MPEG audio decoder 14 only for the selected voice, that is, only for the main voice when the main voice is selected, but only for the sub voice when the sub voice is selected, in accordance with the speed conversion processing routine 30 illustrated in FIG. 16 based on a result of discrimination of the sound presence/absence discrimination section 22 described above, and writes the sound data after the processing into the output buffer 24.

Then, the sound data after the speed conversion processing are read out from the output buffer 24 and converted into an analog sound signal by the D/A converter 25. Then, the analog sound signal is outputted simultaneously to the sound amplifiers 26a and 26b.

When sound signals for the main voice and the sub voice are to be reproduced simultaneously, similarly as upon reproduction of a stereo sound signal, the sound presence/absence discrimination section 22 calculates an average value of the sound data of the main voice and the sub voice, and discriminates whether or not the average value exceeds the threshold value to discriminate whether or not the discrimination unit period is a sound presence portion or a sound absence portion. The speed conversion processing section 23 performs the speed conversion process independently for the sound data of the main voice and the sub voice, and analog sound signals of the main voice and the sub voice are outputted from the sound amplifiers 26a and 26b, respectively.

However, when sound signals of the main voice and the sub voice are reproduced simultaneously, the sound presence/absence discrimination section 22 may perform discrimination between a sound presence portion and a sound absence portion independently for the sound data of the main voice and the sub voice.

While the sound processing section 15 shown in FIG. 27 does not include an amplitude suppression processing section, it may otherwise include an amplitude suppression processing section so that the amplitude at a termination portion of a continuous sound portion of sound data of the output of the MPEG audio decoder 14 may be suppressed. In the modified form of the sound processing section 15 just described, when a stereo sound signal is to be reproduced or when sound signals of the main voice and the sub voice are to be reproduced simultaneously, the amplitude suppression process is performed independently for sound data of the left and right channels or sound data of the main voice and the sub voice similarly as in the speed conversion process.

While the foregoing description relates to 2 channels, it applies similarly to processing for 3 or more channels.

(Second Example—FIG. 28)

Further, generally for multiple channels more than 2 channels, such a construction as shown in FIG. 28 may be employed. Referring to FIG. 28, the apparatus shown is a modification to the reproduction apparatus of FIG. 1. In particular, sound data of multi-channels are demultiplexed by the demultiplexer 7, and resulting data are decompressed and decoded by MPEG audio decoders 14a, 14b, 14c, . . . and supplied to sound processing sections 15a, 15b, 15c, . . . , respectively. The sound processing sections 15a, 15b, 15c, . . . are individually constructed similarly to the sound processing section 15 shown in FIG. 2, 22 or 24.

The apparatus shown in FIG. 28 can selectively or simultaneously perform reproduction and selectively or simultaneously perform a speed conversion process for sound signals of channels 1, 2, 3, . . . such that, for example, for the channel 1, a sound signal is reproduced and undergoes a speed conversion process by the speed conversion processing section 23a of the sound processing section 15a whereas, for the channel 2, a sound signal is reproduced, but a speed conversion process for the sound signal is not performed by the speed conversion processing section 23b of the sound processing section 15b.

Figure 29:
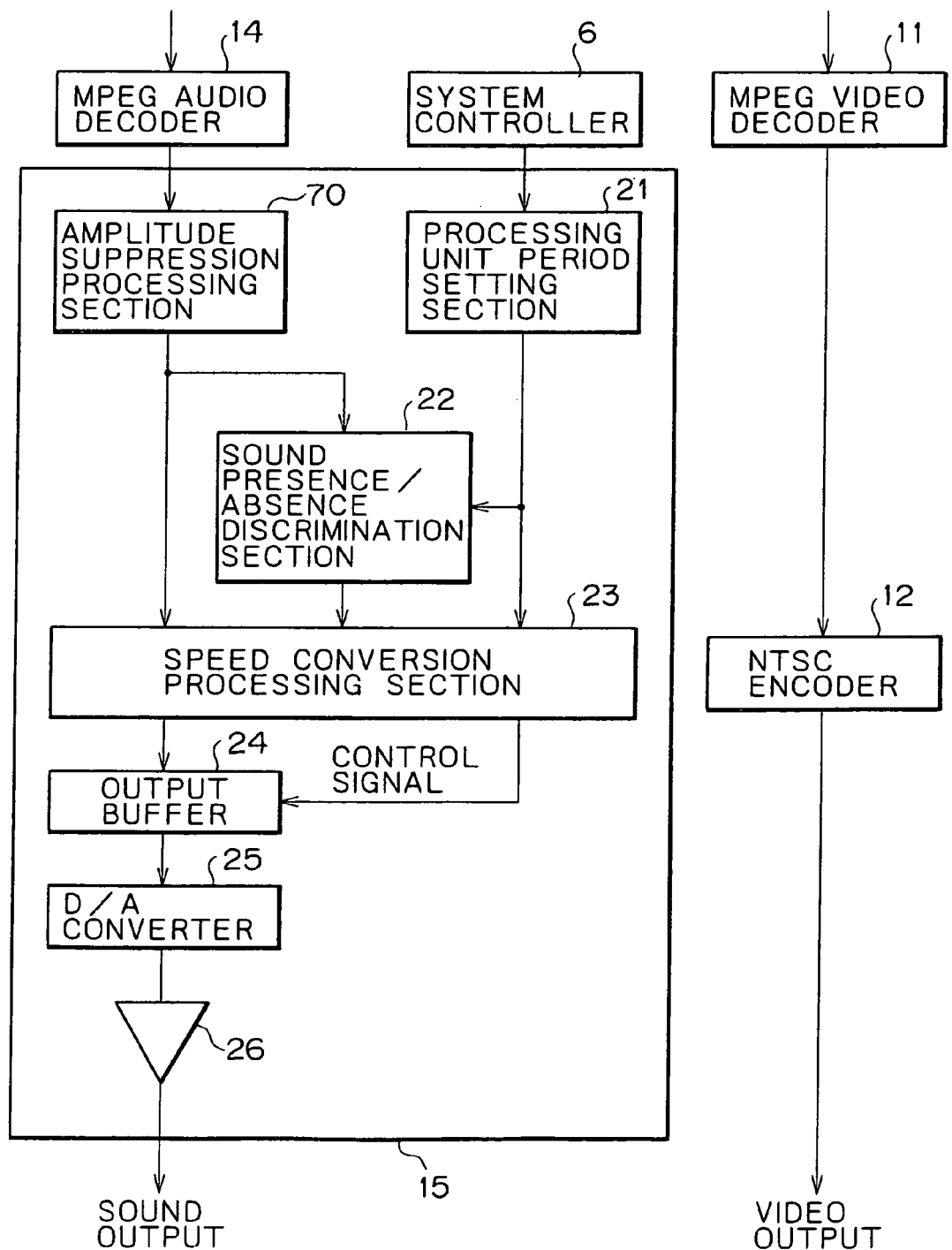
FIG. 29 is a block diagram showing an example of a reproduction apparatus ready for normal speed reproduction.

[Where a Video Signal and a sound Signal are Reproduced at a Normal Speed—FIG. 29]

When a video signal and a sound signal are reproduced at a normal speed from the recording medium 1 by the reproduction apparatus of FIG. 1, sound data are outputted at the normal speed from the MPEG audio decoder 14, and the processing unit period setting section 21, sound presence/absence discrimination section 22 and speed conversion processing section 23 of the sound processing section 15 shown in FIG. 2 or 27 stop their functions. Then, where the sound processing section 15 includes the amplitude suppression processing section 70, sound data of the output of the amplitude suppression processing section 70 are written as they are into the output buffer 24, but where the sound processing section 15 does not include the amplitude suppression processing section 70, the sound data of the output of the MPEG audio decoder 14 are written as they are into the output buffer 24, whereafter the sound data are read out from the output buffer 24.

However, since the MPEG video decoder 11 requires a time at least for a few frames for decompression decoding of video data, a video output of the NTSC encoder 12 exhibits a time delay with respect to the sound output of the sound processing section 15, and synchronism between the video output and the sound output is lost.

Therefore, in an apparatus described below, upon normal speed reproduction, the output buffer 24 is utilized to absorb such a time delay of a vide output from a sound output so that the video output and the sound output may be synchronized with each other.

FIG. 29 shows a construction of the apparatus just described. Referring to FIG. 29, the speed conversion processing section 23 signals a control signal to the output buffer 24 in response to a reproduction mode indicated by the system controller 6 to control the timing at which data is to be read out from the output buffer 24.

More particularly, the speed conversion processing section 23 controls an output point of the output buffer 24 which functions as a ring buffer of a FIFO structure as shown in FIG. 15. In particular, the speed conversion processing section 23 controls the output pointer so that the amount of data stored between the output pointer and the input pointer of the output buffer 24 may correspond to the delay time of the video output from the sound output.

For example, where the delay time of the video output from the sound output where such control as just described is not used is represented by Dv (ms), the sampling frequency of the sound signal is represented by Fs (kHz) and the sound data are a stereo (2-channel) sound signal whose data width is Bh (bits), the data storage amount Ad (bytes) between the output pointer and the input pointer is controlled as given by $$Ad=(Dv \times Fs \times Bh \times 2)/8 \quad (4)$$

As described above, according to the apparatus shown in FIG. 29, when a video signal and a sound signal are reproduced at a normal speed, the video output and the sound output can be synchronized with each other making use of the output buffer 24.

[Other Forms]

While the reproduction apparatus of FIG. 1 uses a recording medium in the form of a disk as the recording medium 1, the present invention can be applied similarly also where the recording medium (storage medium) is a magnetic tape, a semiconductor memory or some other medium. Where the recording medium is a semiconductor memory, it is a matter of course that not a reproduction head but a reading circuit is used to read out a sound signal written in the memory. In this instance, "recording" is writing, and "reproduction" is reading out.

Further, the present invention can be applied similarly to reproduction only of a sound signal from a recording medium or an apparatus which reproduces only a sound signal from a recording medium except such an apparatus as described hereinabove with reference to FIG. 29 which reproduces a video signal and a sound signal at a normal speed.

While a preferred embodiment of the present invention has been described using specific terms, such description is for illustrative purposes only, and it is to be understood that changes and variations may be made without departing from the spirit or scope of the following claims.

What is claimed is:

1. A sound reproduction method, comprising the steps of:
   delimiting a reproduction input sound signal obtained by reproducing, from a recording medium, a sound signal recorded on the recording medium at a speed higher than a normal speed into successive processing unit periods;
   deleting a sound absence portion or portions of the reproduction input sound signal within a range within which a reproduction output sound signal of an amount corresponding to that at the normal speed is obtained from an output buffer to join sound presence portions of the reproduction input sound signal which precede and follow the sound absence portion or portions to obtain a joined reproduction input sound signal for each processing unit period;
   partly deleting, if a sound presence portion or portions of an amount which cannot be stored into said output buffer are included in the reproduction input sound signal of any of the processing unit periods, the sound presence portion or portions to join sound presence portions which precede and follow the sound absence portion or portions and compressing the reproduction input sound signal of the processing unit period to obtain a compressed reproduction input sound signal of the processing unit period; and
   writing the joined reproduction input sound signal or the compressed reproduction input signal for each processing unit period into said output buffer;
   wherein, when a sound absence portion is to be deleted to join sound presence portions which precede and follow the sound absence portion to each other, fade-out processing is performed for the sound presence portion which precedes the joining point between the sound presence portions whereas fade-in processing is performed for the sound presence portion which follows the joining point.

2. A sound reproduction method according to claim 1, wherein, when the reproduction input sound signal of a processing unit period is to be compressed, sound presence portions which precede and follow the sound absence portion or each of the sound presence portions to be deleted are joined together by cross fading such that the preceding and following sound presence portions are partially overlapped with each other within a fade period and a positional relationship of the preceding and following sound presence portions is adjusted so that a finite difference between the preceding and following sound presence portions within the fade period may be minimized.

3. A sound reproduction method according to claim 1, wherein the processing unit periods have a fixed time.

4. A sound reproduction method according to claim 1, wherein each of the processing unit periods has a time which varies in response to a musical interval of a main component of the reproduction input sound signal.

5. A sound reproduction method according to claim 1, wherein a boundary between a sound absence portion and a sound presence portion of the reproduction input sound signal or a portion in a sound presence portion of the reproduction input sound signal which is relatively low in level is decided as a breakpoint of a processing unit period.

6. A sound reproduction method according to claim 1, wherein, when sound outputs of a plurality of channels are to be obtained, discrimination between a sound presence portion and a sound absence portion is performed based on an average value of the reproduction input sound signal of each channel, and joining of sound presence portions is performed independently for each of the reproduction input sound signals of the channels.

7. A sound reproduction method according to claim 1, wherein, upon normal speed reproduction, said output buffer is used for time adjustment to synchronize a video output and a sound output with each other.

8. A sound reproduction method, comprising the steps of:
   suppressing an amplitude of a termination portion of each continuous sound portion of a reproduction input sound signal obtained by reproducing, from a recording medium, a sound signal recorded on the recording medium at a speed higher than a normal speed;
   delimiting the reproduction input sound signal after the amplitude suppression processing into successive processing unit periods;
   deleting a sound absence portion or portions of the reproduction input sound signal within a range within which a reproduction output sound signal of an amount corresponding to that at the normal speed is obtained from an output buffer to join sound presence portions of the reproduction input sound signal which precede and follow the sound absence portion or portions to obtain a joined reproduction input sound signal for each processing unit period;
   partly deleting, if a sound presence portion or portions of an amount which cannot be stored into said output buffer are included in the reproduction input sound signal of any of the processing unit periods, the sound presence portion or portions to join sound presence portions which precede and follow the sound absence portion or portions and compressing the reproduction input sound signal of the processing unit period to obtain a compressed reproduction input sound signal of the processing unit period; and
   writing the joined reproduction input sound signal or the compressed reproduction input signal for each processing unit period into said output buffer.

9. A sound reproduction method according to claim 8, wherein, in the step of suppressing the amplitude of a termination portion of each continuous sound portion, a termination of the continuous sound portion is predicted, and suppression of the amplitude is started at the predicted point whereas the suppression of the amplitude is cancelled when a start point of a next continuous sound portion is detected.

10. A sound reproduction method according to claim 9, wherein, when a signal level of the reproduction input sound signal is in a decreasing tendency and besides becomes lower than a threshold level, it is discriminated that the continuous sound portion enters a process to approach a termination, and the termination of the continuous sound portion is predicted.

11. A sound reproduction method according to claim 10, wherein a peak value of the signal level of the reproduction input sound signal is detected, and the threshold value is set in response to the detected peak value.

12. A sound reproduction method according to claim 8, wherein, in the step of suppressing the amplitude of a termination portion of each continuous sound portion, the reproduction input sound signal is delayed, and a termination of the continuous sound portion is detected from the reproduction input sound signal before delayed and the amplitude of the reproduction input sound signal after delayed is suppressed based on a result of the detection.

13. A sound reproduction apparatus, comprising:
- a processing unit period setting section for setting successive processing unit periods for speed conversion processing to be performed for a reproduction input sound signal obtained by reproducing, from a recording medium, a sound signal recorded on the recording medium at a speed higher than a normal speed;
- an output buffer for obtaining a reproduction output sound signal; and
- a speed conversion processing section for deleting a sound absence portion or portions of the reproduction input sound signal within a range within which a reproduction output sound signal of an amount corresponding to that at the normal speed is obtained from said output buffer to join sound presence portions of the reproduction input sound signal which precede and follow the sound absence portion or portions to obtain a joined reproduction input sound signal for each processing unit period, partly deleting, if a sound presence portion or portions of an amount which cannot be stored into said output buffer are included in the reproduction input sound signal of any of the processing unit periods, the sound presence portion or portions to join sound presence portions which precede and follow the sound presence portion or portions and compressing the reproduction input sound signal of the processing unit period to obtain a compressed reproduction input sound signal of the processing unit period, and writing the joined reproduction input sound signal or the compressed reproduction input signal for each processing unit period into said output buffer.

14. A sound reproduction apparatus according to claim 13, wherein said speed conversion section performs, when a sound absence portion is to be deleted to join sound presence portions which precede and follow the sound absence portion to each other, fade-out processing for the sound presence portion which precedes the joining point between the sound presence portions whereas and performs fade-in processing for the sound presence portion which follows the joining point.

15. A sound reproduction apparatus according to claim 13, wherein said speed conversion processing section joins, when the reproduction input sound signal of a processing unit period is to be compressed, sound presence portions which precede and follow the sound absence portion or each of the sound presence portions to be deleted together by cross fading such that the preceding and following sound presence portions are partially overlapped with each other within a fade period and a positional relationship of the preceding and following sound presence portions is adjusted so that a finite difference between the preceding and following sound presence portions within the fade period may be minimized.

16. A sound reproduction apparatus according to claim 13, wherein said processing unit period setting section sets the processing unit periods so as to have a fixed time.

17. A sound reproduction apparatus according to claim 13, further comprising a musical interval detection section for detecting a musical interval of a main component of the reproduction input sound signal, and wherein said processing unit period setting section sets each of the processing unit periods to have a time which varies in response to a musical interval of a main component of the reproduction input sound signal.

18. A sound reproduction apparatus according to claim 13, wherein said processing unit period setting section decides a boundary between a sound absence portion and a sound presence portion of the reproduction input sound signal or a portion in a sound presence portion of the reproduction input sound signal which is relatively low in level as a breakpoint of a processing unit period.

19. A sound reproduction method, comprising:
- an amplitude suppression processing section for suppressing an amplitude of a termination portion of each continuous sound portion of a reproduction input sound signal obtained by reproducing, from a recording medium, a sound signal recorded on the recording medium at a speed higher than a normal speed into successive processing unit periods;
- a processing unit period setting section for setting successive processing unit periods for speed conversion processing to be performed for the reproduction input sound signal after the amplitude suppression processing;
- an output buffer for obtaining a reproduction output sound signal; and
- a speed conversion processing section for deleting a sound absence portion or portions of the reproduction input sound signal within a range within which a reproduction output sound signal of an amount corresponding to that at the normal speed is obtained from said output buffer to join sound presence portions of the reproduction input sound signal which precede and follow the sound absence portion or portions to obtain a joined reproduction input sound signal for each processing unit period, partly deleting, if a sound presence portion or portions of an amount which cannot be stored into said output buffer are included in the reproduction input sound signal of any of the processing unit periods, the sound presence portion or portions to join sound presence portions which precede and follow the sound presence portion or portions and compressing the reproduction input sound signal of the processing unit period to obtain a compressed reproduction input sound signal of the processing unit period, and writing the joined reproduction input sound signal or the compressed reproduction input signal for each processing unit period into said output buffer.

* * * * *